United States Patent
Bulboff

(10) Patent No.: US 12,403,869 B2
(45) Date of Patent: Sep. 2, 2025

(54) VEHICLE WASH SYSTEM WITH BELT CONVEYOR

(71) Applicant: Montage Vehicle Innovations, LLC, Riverview, FL (US)

(72) Inventor: Stephen Bulboff, Riverview, FL (US)

(73) Assignee: Montage Vehicle Innovations, LLC, Riverview, FL (US)

( * ) Notice: Subject to any disclaimer, the term of this patent is extended or adjusted under 35 U.S.C. 154(b) by 0 days.

(21) Appl. No.: 18/901,486

(22) Filed: Sep. 30, 2024

(65) Prior Publication Data

US 2025/0108778 A1    Apr. 3, 2025

Related U.S. Application Data

(60) Provisional application No. 63/541,510, filed on Sep. 29, 2023.

(51) Int. Cl.
B60S 3/00          (2006.01)
(52) U.S. Cl.
CPC .................................... B60S 3/004 (2013.01)
(58) Field of Classification Search
CPC ....................................................... B60S 3/004
See application file for complete search history.

(56) References Cited

U.S. PATENT DOCUMENTS

| RE30,026 E | 6/1979 | Hanna |
| 4,374,496 A | 2/1983 | Hanna |
| 11,465,596 B1 | 10/2022 | Cecala et al. |
| 2010/0108467 A1 | 5/2010 | Barreyre et al. |
| 2023/0256943 A1 | 8/2023 | Malki |

FOREIGN PATENT DOCUMENTS

| EP | 1059214 A2 | 12/2000 | |
| GB | 1064301 A | 4/1967 | |
| GB | 1379567 A | 1/1975 | |
| WO | WO2007142957 A2 * | 12/2007 | .............. F24F 7/007 |

OTHER PUBLICATIONS

International Search Report and Written Opinion mailed Jan. 3, 2025 in corresponding International Patent Application No. PCT/US2024/049189.

* cited by examiner

Primary Examiner — Jason Y Ko
(74) Attorney, Agent, or Firm — Troutman Pepper Locke LLP

(57) ABSTRACT

Provided herein is a vehicle wash system. The vehicle wash system comprises a tunnel having a length extending between an entrance opening and an exit opening, a vehicle wash path extending along the length of the tunnel, a conveyor extending along at least one side of the vehicle wash path, and wash equipment disposed along the sides and overhead of the vehicle wash path. The conveyor comprises a frame, a drive roller connected to the frame, a tail roller connected to the frame, a belt in contact with the drive roller and the tail roller, a plurality of idler rollers, and a plurality of bushings connected to the frame, wherein each idler roller is rotatably connected to at least one of the bushings. In some embodiments, each idler roller is configured to rotate only when subjected to a load from a vehicle on the belt above the idler roller.

26 Claims, 33 Drawing Sheets

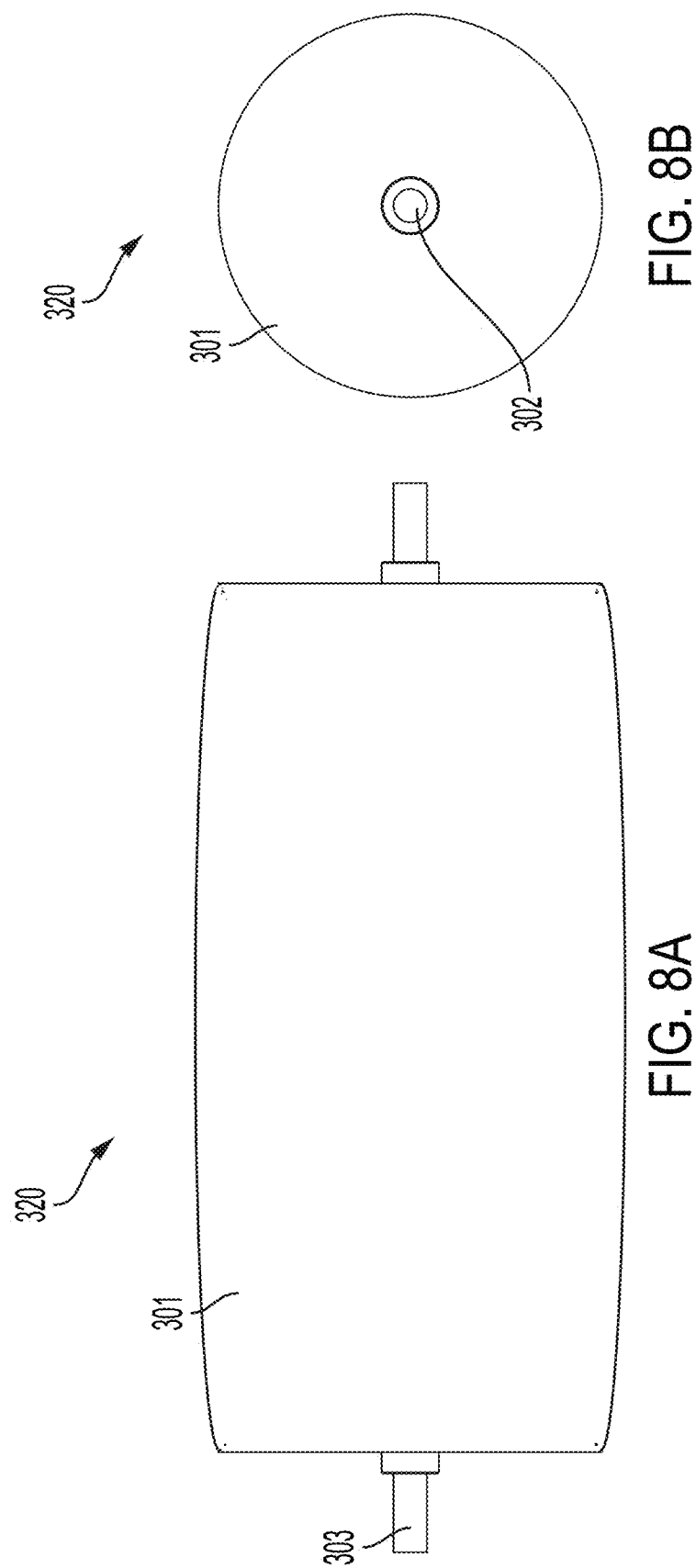

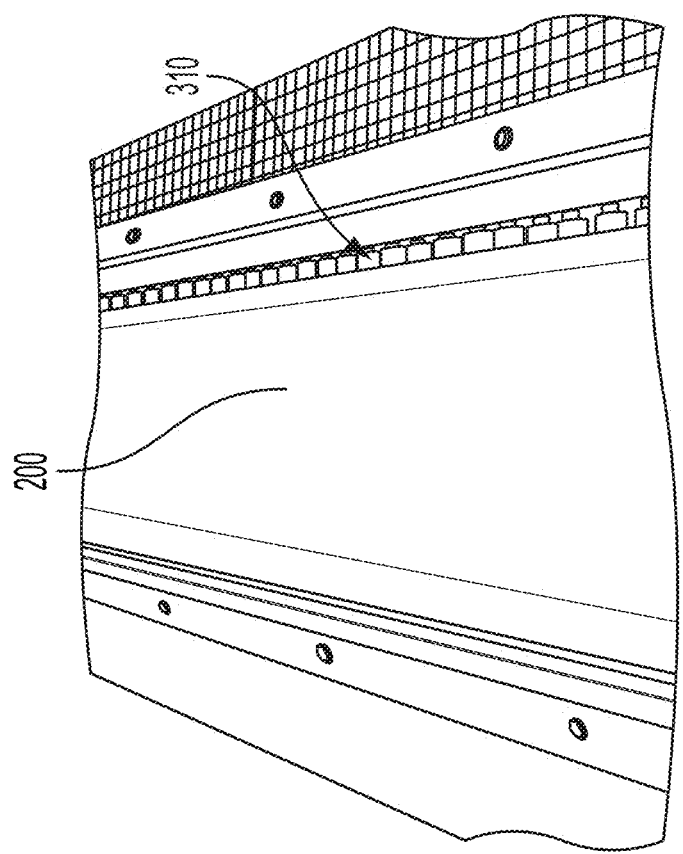
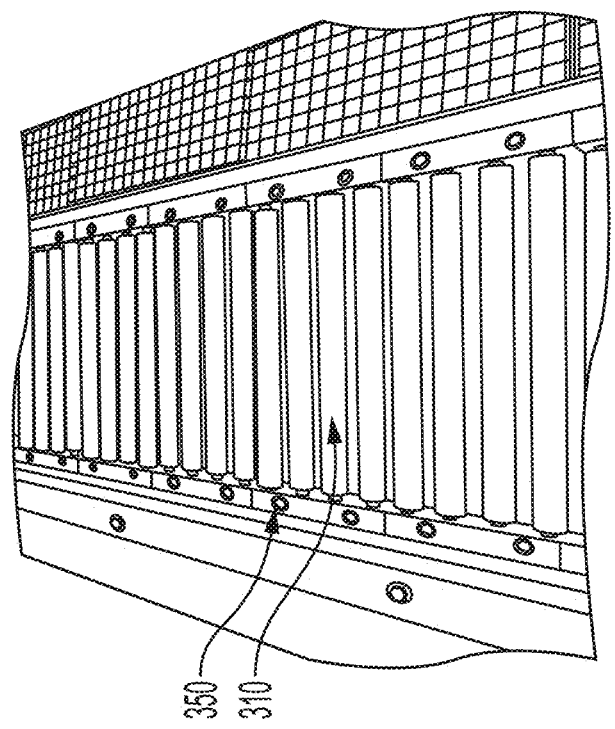
FIG. 9A
FIG. 9B

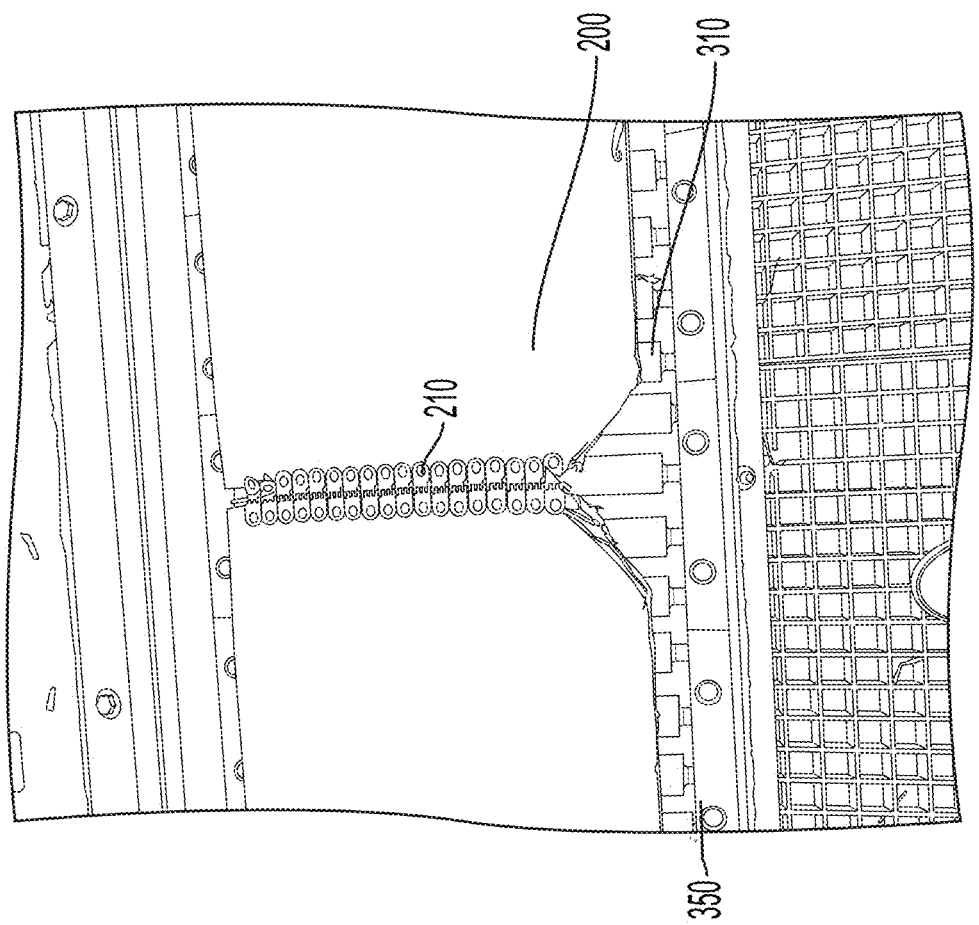

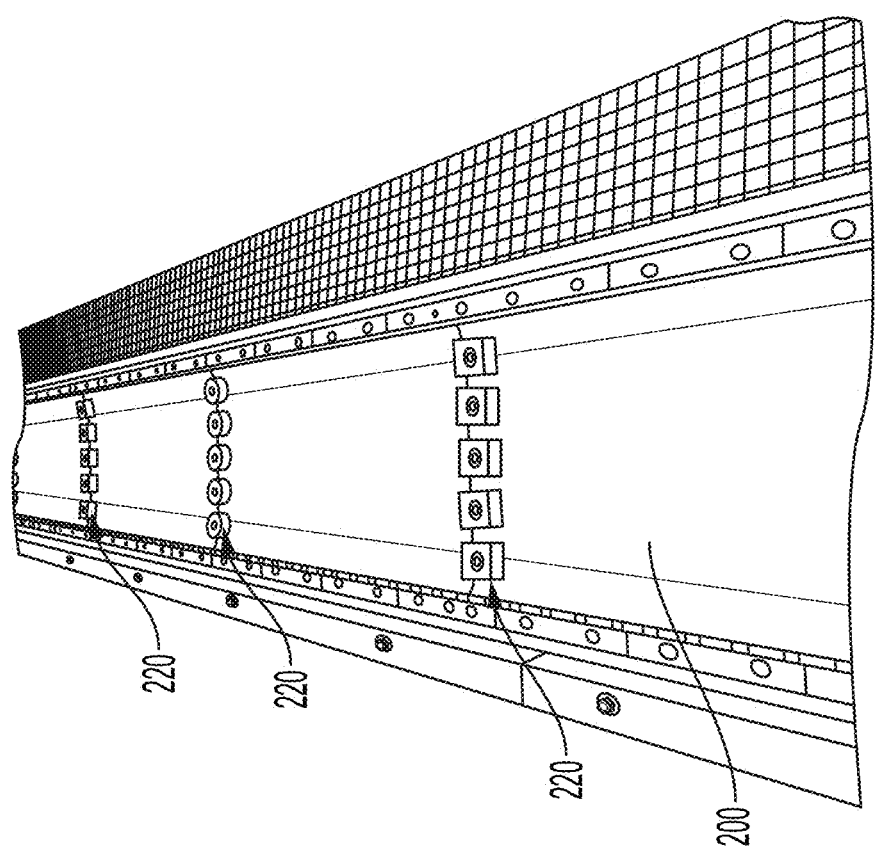

VEHICLE WASH SYSTEM WITH BELT CONVEYOR

CROSS REFERENCE TO RELATED APPLICATIONS

This application claims the benefit of priority of U.S. Provisional Patent Application Ser. No. 63/541,510, filed on Sep. 29, 2023, entitled "System and Method for Vehicle Washing," the entire contents of which is hereby incorporated by reference herein.

TECHNICAL FIELD

The present disclosure pertains to the field of vehicle washing systems, including conveyor technologies for moving a vehicle through a wash system, wash equipment, and methods of vehicle washing.

BACKGROUND

Automotive vehicles are exposed to a variety of environmental contaminants such as dirt, dust, road grime, grease, bird droppings, etc., necessitating frequent cleaning to preserve their aesthetic and functional integrity. Traditional systems for cleaning and treating these vehicles often operate on conveyor systems for moving the vehicles through wash equipment. However, there exist significant limitations in current technologies.

Conventional conveyor systems in vehicle washing facilities are generally designed for a narrow range of vehicle types and sizes, primarily standard passenger vehicles. They frequently lack versatility to accommodate larger or specially modified vehicles like dual-wheeled trucks, sprinter vans, tractor-trailers, and the like. Additionally, these systems often require manual adjustments for wheel misalignments and frequent maintenance activities, such as lubrication and parts replacements, particularly for bearings, bushings, and other mechanical components. This leads to operational inefficiencies, wear and tear, and increased susceptibility to degradation and corrosion over time.

On the wash side, most existing systems employ basic technologies like sprayers, brushes, and limited ranges of detergents. Existing systems lack specialized chemical application methods tailored for specific cleaning objectives, as well as control mechanisms for precise control of water and chemical quality, temperature, and pressure. Existing systems thus do not address the diverse types of contaminants effectively. As a result, conventional vehicle wash methods are often resource-inefficient, consuming large volumes of water and chemicals, and lack adaptability to real-time conditions, such as varying levels of vehicle contamination.

Given these constraints and limitations, there is an unmet need for a versatile, low-maintenance conveyor system capable of handling a wide array of vehicle sizes, shapes, dimensions, and alignments. There is also a need for comprehensive, resource-efficient, and highly effective wash equipment and processes.

SUMMARY

Disclosed herein is a vehicle wash system with a conveyor belt.

In some embodiments, the vehicle wash system comprises a tunnel having a length extending between an entrance opening and an exit opening. In some embodiments, the vehicle wash system comprises a vehicle wash path extending along the length of the tunnel.

In some embodiments, the vehicle wash system comprises a conveyor extending along at least one side of the vehicle wash path.

In some embodiments, the conveyor comprises a frame connected to a floor of the tunnel and extending along the vehicle wash path. In some embodiments, the conveyor comprises a drive roller connected to the frame at a first end of the conveyor, the drive roller being connected to a motor to rotate the drive roller. In some embodiments, the conveyor comprises a tail roller connected to the frame at a second end of the conveyor opposite the drive roller.

In some embodiments, the conveyor comprises a belt in contact with the drive roller and the tail roller. In some embodiments, the belt rotates over the drive roller and the tail roller as it is driven by the drive roller, rotating in a forward direction along an upper portion of the conveyor from an entrance end of the conveyor to an exit end of the conveyor and in a backward direction along an underside portion of the conveyor from the exit end of the conveyor to the entrance end of the conveyor.

In some embodiments, the conveyor comprises a plurality of idler rollers, each idler roller comprising an exterior cylindrical body and an interior cylindrical shaft extending beyond the exterior cylindrical body at both ends. In some embodiments, the idler rollers are positioned at intervals along the conveyor between the drive roller and the tail roller and between the upper portion and lower portion of the belt. In some embodiments, the conveyor comprises a plurality of bushings connected to the frame, each bushing comprising an aperture for receiving the interior cylindrical shaft of idler rollers, wherein each idler roller is rotatably connected to at least one of the bushings. In some embodiments, each idler roller is configured to rotate only when subjected to a load from a vehicle on the belt above the idler roller.

In some embodiments, the vehicle wash system comprises wash equipment disposed along the sides and overhead of the vehicle wash path. In some embodiments, when a vehicle to be washed enters the tunnel through the entrance opening, it is transported along the vehicle wash path via the conveyor, it is cleaned as it progresses through the vehicle wash path by the wash equipment, and then it exist the tunnel through the exit opening.

In some embodiments, the idler rollers do not rotate when the upper portion of the belt supporting the vehicle is not in contact with the idler rollers.

In some embodiments, the belt is unhinged.

In some embodiments, the drive roller is located at the exit end of the conveyor, and the tail roller is located at the entrance end of the conveyor.

In some embodiments, the belt is tensioned between the drive roller and the tail roller such that the belt has a catenary sag when no vehicle is present that is less than or equal to a predetermined value, thereby reducing a normal force between the belt and idler rollers such that the idler rollers do not rotate when no vehicle load is present.

In some embodiments, the belt has a transverse width between about 12 inches and about 36 inches. In other embodiments, the belt has a transverse width between about 16 inches and about 36 inches. In other embodiments, the belt has a transverse width between about 20 inches and about 36 inches. This larger transverse width of the belt allows the conveyor to accommodate larger and oversized vehicles, such as tractor trailers, heavy-duty vehicles with two wheels on each side of the rear axle, vehicles pulling trailers, etc.

In some embodiments, the conveyor further comprises at least one intermediate roller positioned between the drive roller and tail roller and in between the plurality of idler rollers, such that the upper portion of the belt is in contact with the at least one intermediate roller when the belt is unloaded. In some embodiments, the at least one intermediate roller is positioned at approximately a midpoint between the drive roller and the tail roller. In some embodiments, the conveyor further comprises a plurality of intermediate rollers positioned between the drive roller and the tail roller, wherein each of the plurality of intermediate rollers is spaced equidistance from each other between the drive roller and the tail roller.

In some embodiments, the conveyor further comprises a transverse camber across its width by elevating the conveyor relative to a static guideway positioned alongside the conveyor. In some embodiments, the transverse camber creates an elevation different between the conveyor and the static guideway, the elevation difference characterized by a ratio of about 1 inch of rise over about 60 inches of horizontal distance.

In some embodiments, the conveyor further comprises a longitudinal gradient along its length, the gradient being an incline from the entrance end to the exit end of the conveyor. In some embodiments, the longitudinal gradient is a ratio of about 1 inch of vertical rise for every about 10 feet of linear distance.

In some embodiments, each idler roller is comprised of stainless steel.

In some embodiments, each idler roller has a mass selected such that, under a tension and weight provided by the belt without any additional load, a torque exerted by the belt on the idler roller is less than a breakaway torque of the idler roller, thereby preventing rotation of the idler roller when no load is present on the belt.

In some embodiments, each idler roller only rotates when subjected to a load from the vehicle on the belt above the idler roller.

In some embodiments, the vehicle wash system further comprises a static guideway extending along the length of the tunnel on a side of the vehicle wash path opposite and parallel to the conveyor. In some embodiments, the static guideway is smoothed to reduce surface irregularities and coated with an epoxy.

In some embodiments, the bushings are comprised of ultra-high-molecular-weight polyethylene (UHMW-PE).

In some embodiments, the drive roller has a crowned shape, with a larger diameter at its longitudinal center point relative to its cylindrical ends.

In some embodiments, the conveyor can carry a load of at least 14,000 pounds per foot.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 8A depicts a side view of a drive roller, showing its entire length, according to an embodiment of the present disclosure.

FIG. 8B depicts an end view of a drive roller, according to an embodiment of the present disclosure.

FIG. 9A depicts a partially constructed, detailed view of a conveyor, highlighting idler rollers without a belt, according to an embodiment of the present disclosure.

FIG. 9B depicts the conveyor as shown in FIG. 9A, with the belt included, according to an embodiment of the present disclosure.

FIG. 16A depicts an exemplary embodiment of a conveyor in which a belt sits atop a plurality of idler rollers, the idler rollers being operatively connected to a plurality of bushings and the belt being connected at its ends by a belt connector, according to an embodiment of the present disclosure.

FIG. 17 depicts an exemplary embodiment of a belt wherein pucks are positioned in rows across the length of the belt, according to an embodiment of the present disclosure.

DETAILED DESCRIPTION

Figure 1:
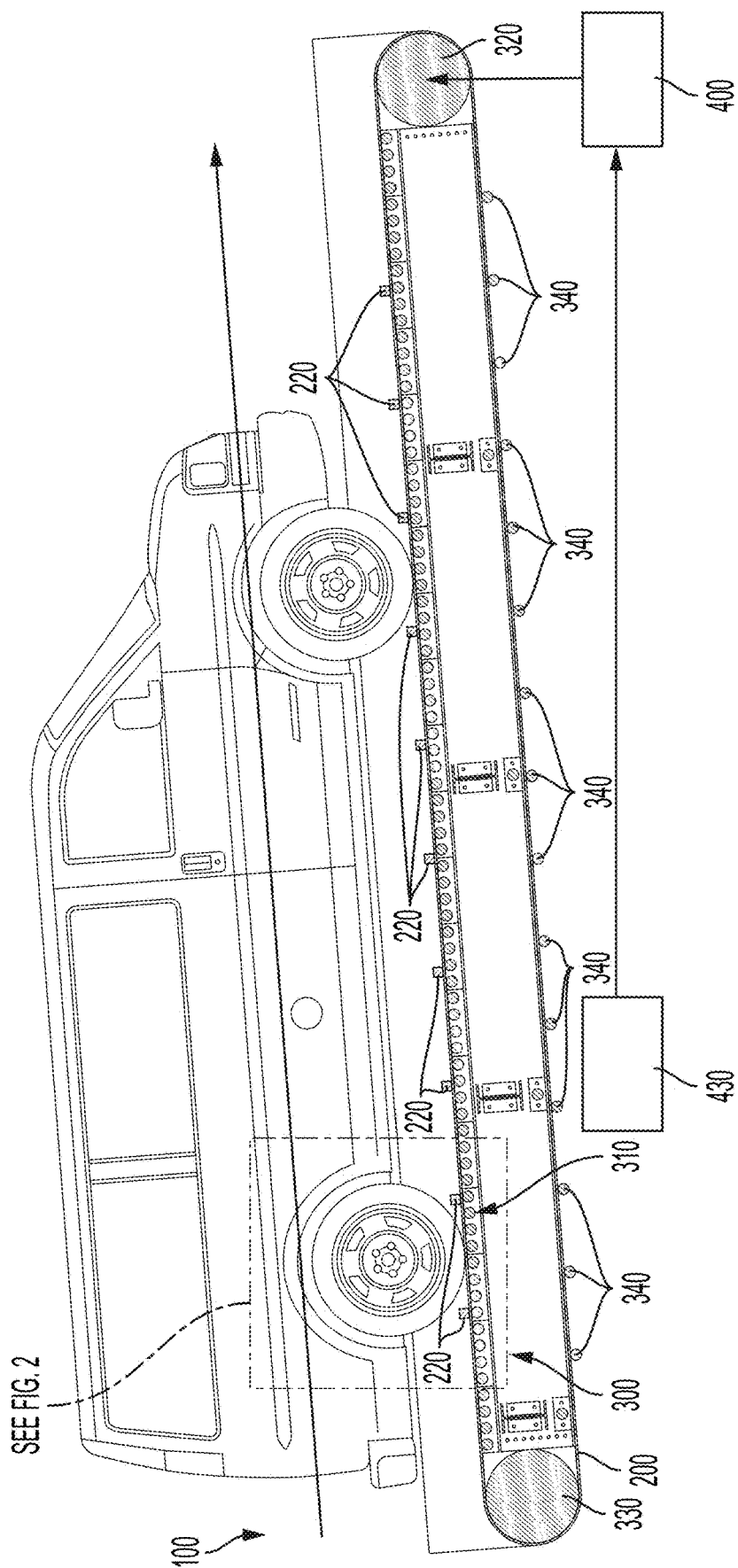
FIG. 1 depicts a cross-sectional side view of a conveyor, according to an embodiment of the present disclosure.

In some embodiments, the present disclosure pertains to a conveyor system designed for transporting vehicles through a vehicle wash facility. This conveyor system can transport a broad spectrum of vehicles, ranging in size from compact passenger cars to specialized and bulky vehicles like dual-wheeled trucks, sprinter vans, school buses, and large tractor-trailers, etc. through a vehicle wash facility.

In some embodiments, the present disclosure pertains to a wash system characterized by integrated water management and purification, chemical mixing, and temperature control subsystems, as well as a multi-staged cleaning method. This process may comprise reverse osmosis ("RO") water filtration units, temperature control units, and a pulse feeder metering subsystem for controlling the release of wash chemicals. The integration of these components permits precise, real-time control over the chemical-to-water ratios and temperature, thereby providing effective cleaning and resource efficiency. In some embodiments, the equipment within the wash system is structured to accommodate a broad spectrum of vehicles, ranging in size from compact passenger cars to specialized and bulky vehicles like dual-wheeled trucks, sprinter vans, school buses, and large tractor-trailers, through a vehicle wash facility.

Conveyor System

In some embodiments, a conveyor system carries a vehicle through a vehicle wash facility along its length. The system may form part of a comprehensive vehicle wash system, such that the vehicle wash system can wash, dry, and carry out other various wash related activities as the conveyor moves the vehicle along the conveyor path and through the vehicle wash facility.

In some embodiments, the conveyor system comprises at least one conveyor 100. In some embodiments, the conveyor comprises several sub-components, including, but not limited to, a frame 800, a conveyor belt 200, a roller deck assembly 300, a motor and gearbox assembly 400, a power pack 430 and a divider 431.

In some embodiments, conveyor 100 is designed such that only some of the rollers are engaged as a vehicle traverses the wash facility, thereby enhancing durability of the system by reducing unnecessary wear and tear.

In some embodiments, the conveyor system comprises a horizontal transverse camber across its width, which aids in correctly aligning a diverse range of vehicle types. In some embodiments, the conveyor system comprises a longitudinal gradient elevation along its length, starting from the point of entry and rising to the point of exit.

In some embodiments, the conveyor system comprises one conveyor 100. In some embodiment, the conveyor system comprises at least two conveyors 100. This multi-conveyor configuration ensures that each side of a vehicle, both right and left sides (also known as passenger and driver sides), is supported by its own conveyor 100. In some embodiments, the conveyor system comprises multiple conveyors 100 along either the passenger side, the driver side, or both sides of the length of the car wash facility. In this arrangement, vehicles may traverse non-conveyor areas as they move through the facility.

FIG. 1 depicts a cross-sectional side view of an exemplary embodiment of a conveyor 100. In some embodiments, conveyor 100 comprises a roller deck assembly 300. Roller deck assembly 300 may comprise a plurality of idler rollers 310, a tail roller 330, and a drive roller 320. Conveyor 100 may comprise a plurality of return rollers 340. Conveyor 100 may comprise a belt 200 that sits atop roller deck assembly 300. In some embodiments, a plurality of pucks 220 may be attached to belt 200. In some embodiments, a motor and gearbox assembly 400 may be operatively connected to drive roller 320. A power pack 430 may be operatively connected to motor and gearbox assembly 400.

Figure 2:
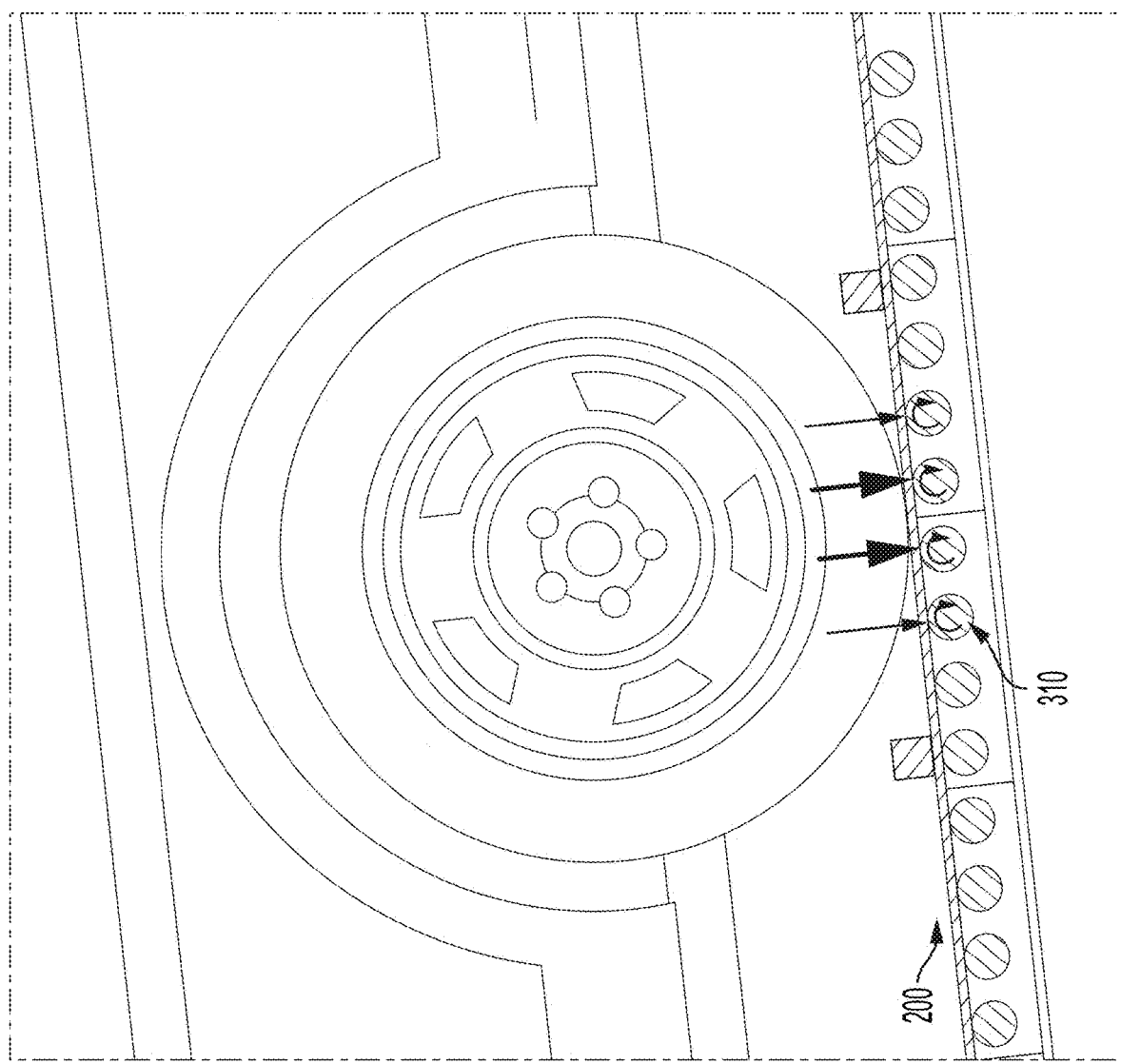
FIG. 2 depicts a detailed view of FIG. 1, zoomed in to detail the interaction between a vehicle's tires, a conveyor belt, and idler rollers, according to an embodiment of the present disclosure.

FIG. 2 depicts a detailed view of FIG. 1, zoomed in to detail the interaction between a vehicle's tires, a conveyor belt 200, and idler rollers 310. Idler rollers 310 only turn when the force of a vehicle's tires cause a sufficient level of friction between belt 200 and engaged idler rollers 310. By configuring belt 200 and idler rollers 310 such that each idler roller 310 only turns when it is supporting the weight of a vehicle wheel, the number of rotations each roller bearing undergoes during a wash cycle can be reduced from hundreds to less than one rotation. This preserves the bearings of the roller, as less water/solvent and dirt are rolled into the bearing.

Achieving this balance requires careful design. When there is no weight directly above a roller, the belt should slide over the surface of the roller (or above the roller), rather than turn the roller (or move without touching the roller surface at all). This means that the circumferential friction force from the belt should be minimized such that the incidental friction of the belt/roller interaction is insufficient to overcome the inertia of the idler roller and the parasitic static friction of the bearings of each idler roller (e.g., a breakaway torque for the resting bearing). This can be achieved by tensioning belt 200 between drive roller 320 and tail roller 330 such that the catenary formed by the sagging belt applies a minimal normal force between belt 200 and each idle roller 310. Note that a vehicle and its respective load will apply additional tension by riding the belt. Similarly, by using a shorter distance between the drive and tail rollers, less catenary sag can be achieved to minimize the normal force. A lighter belt, such as a thinner belt or one with less dense polymer, can also reduce this force or the sag. A heavier belt will sag and apply more normal force to the rollers due to its own weight, which could cause the idler rollers to turn even without a load. A lighter belt will be less likely to cause the rollers to rotate unless additional force from a transported object is present. The belt should be lightweight but durable, with a balance between weight and strength.

The coefficient of friction between the belt and the idler roller surface should be minimized because the incidental circumferential friction force is the product of the normal force and the friction coefficient. In some embodiments, the inner belt face uses a different material from the rest of the belt, chosen for low friction properties. In some embodiments, the roller surface is polished to reduce friction. In some embodiments, each idler roller is solid steel and a sleeve is placed around the roller using a low friction material. In some embodiments, the inner surface of the belt (or surface of the roller) is lubricated with water or oil/grease to minimize the friction between the idler rollers and the belt.

The other component of the idler roller and belt design that can minimize incidental rotation is to increase the friction within the bearing or to increase the inertia of the roller by using a heavy or dense material, such as stainless steel and a radius for the bearing that sufficiently increases the weight. Whether a roller rotates or not is determined by whether the torque introduced by the belt is less than the breakaway torque of the bearing and inertia. Therefore, the ratio of the bearing/axle diameter and the roller diameter should be carefully considered. Similarly, the coefficient of friction within the bearing should also be increased enough that it resists incidental torque.

For example, consider a conveyor system where the conveyor belt is made of a lightweight, durable material (such as polyurethane, natural rubber, synthetic rubber, steel, nylon, silica, polyester, carbon black, and/or petroleum) with a thickness of 0.5 inches and a density of approximately 0.04 pounds per cubic inch. The belt has a width of 24 inches and is tensioned between a drive roller and a tail roller, which are spaced 40 feet apart. The belt tension is set to 200 pounds-force, resulting in a minimal catenary sag of about 1 inch at the midpoint between the rollers. Idler rollers are spaced every 3 inches along the length of the conveyor. Each idler roller is made of solid steel with a diameter of 2 inches (radius of 1 inch) and a length of 24 inches at its exterior cylinder and 28 inches when including its mounting shafts. Each idler roller weighs approximately 18 pounds, providing sufficient inertia to resist incidental rotation. The bushings used for idler rollers 310 are sealed polyethylene bushings with a breakaway torque of approximately 0.05 pound-feet due to static friction. The normal force (N) between the belt and each idler roller, caused by the belt's weight and tension, is approximately 4 pounds. This is calculated based on the belt's weight per unit length and the minimal sag resulting from the set tension. The coefficient of friction (μ) between the inner surface of the belt and the steel surface of the idler rollers is 0.1.

The incidental torque ($T_{incidental}$) acting on an idler roller when no vehicle is present is calculated using the formula: $T_{incidental}=N\times\mu\times r$, where N=4 pounds (normal force), μ=0.1 (coefficient of friction), and r=1 inch (radius of the roller). So, $$T_{incidental} = N \times \mu \times r = 4 \text{ lbs} \times 0.1 \times \frac{1}{12} \text{ ft} = 0.0333 \text{ pound-feet}.$$

Since, in this example, the breakaway torque of the bearing is 0.05 pound-feet, the incidental torque is less than the breakaway torque. This means that the idler rollers will not rotate under the belt's own weight and tension when no vehicle is present, thus reducing necessary wear.

When a vehicle wheel passes over the belt, the additional weight increases the normal force on the idler rollers directly beneath the wheel to approximately 1,000 pounds (assuming a wheel load of 1,000 pounds). The torque when a vehicle is present ($T_{vehicle}$) is:

$$T_{vheicle} = N_{vehicle} \times \mu \times r = 1,000 \text{ lbs} \times 0.1 \times \frac{1}{12} \text{ ft} = 8.33 \text{ pound-feet}.$$

This torque exceeds the breakaway torque, causing the idler rollers to rotate as needed when supporting a vehicle.

This above example demonstrates how selecting appropriate materials, dimensions, belt tension, and surface finishes can create a conveyor system when the incidental torque on the idler rollers is lower than the breakaway torque of the bearings. This ensures that the rollers only rotate when necessary, enhancing the system's durability by reducing wear on the bearings and rollers. These specific dimensions, materials, and values are provided for illustrative purposes only and should not be considered as limiting the invention. Variations in materials, dimensions, configurations, and other parameters may be employed.

Figure 3A:
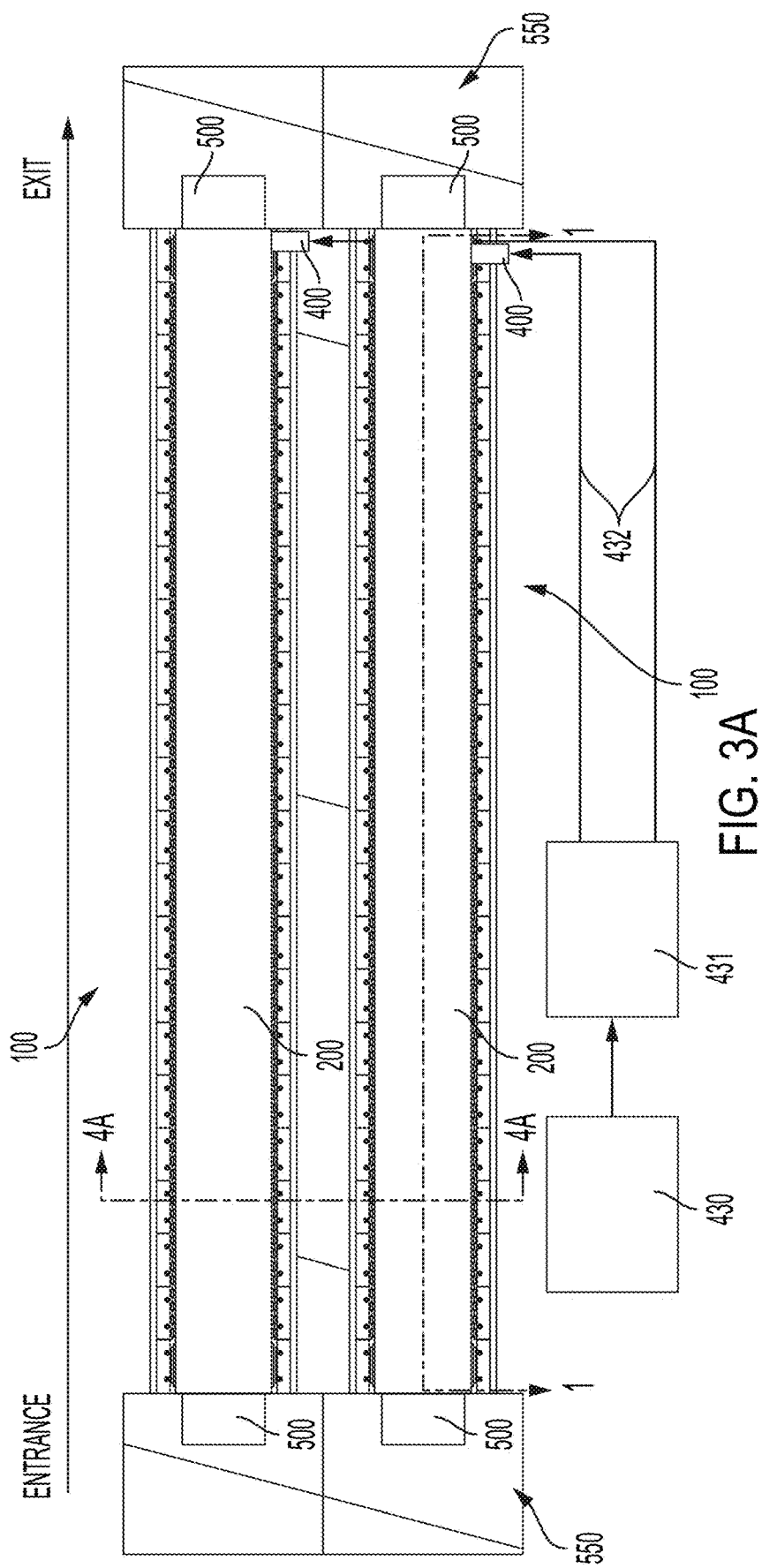
FIG. 3A depicts a top view of a conveyor system, the conveyor system comprising two conveyors, according to an embodiment of the present disclosure.

FIG. 3A depicts a top view of an exemplary embodiment of a conveyor system, the conveyor system comprising two conveyors 100. In some embodiments, two conveyors 100 are positioned such that one conveyor 100 sits below each set of tires (i.e., the one set on the left side and the other set on the right side) of a vehicle passing through a wash facility. Each conveyor 100 may comprise a belt 200. Each conveyor 100 may comprise at least one safety plate 500. In some embodiments, one safety plate 500 may be present at the entry of each conveyor 100 and another safety plate 500 may be present at the exit of each conveyor 100. In some embodiments, each conveyor 100 is operatively connected to a motor and gearbox assembly 400. In some embodiments, each motor and gearbox assembly 400 is operatively connected to a power pack 430. Power pack 430 may be operatively connected to a divider 431. In some embodiments, hoses 432 connect divider 431 and power pack 430 to each motor and gearbox assembly 400 and its corresponding conveyor 100, thereby dividing the power generated by the power pack 430 between each conveyor 100.

Figure 3B:
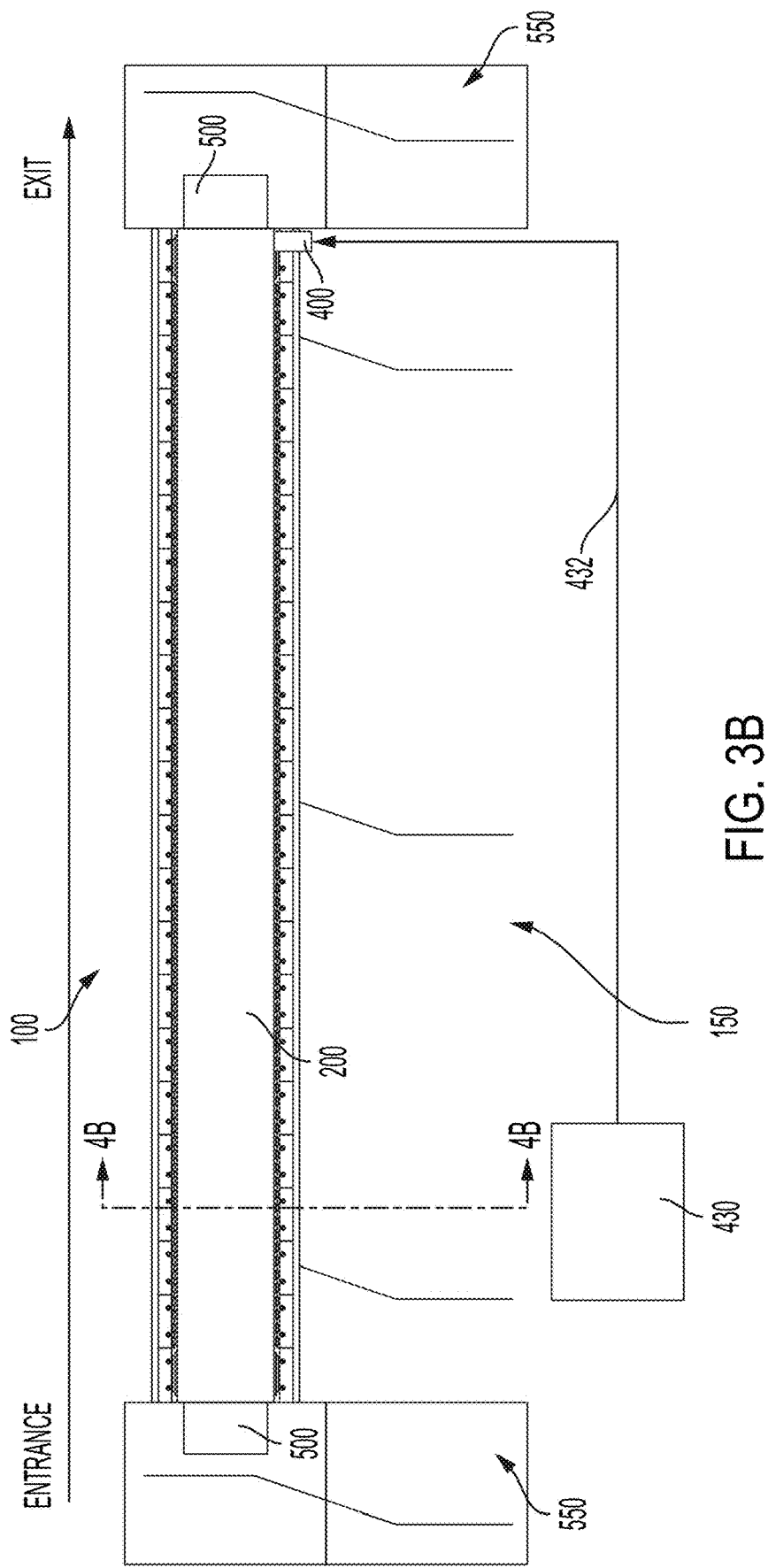
FIG. 3B depicts a top view of a conveyor system, the conveyor system comprising one conveyor and one static guideway, according to an embodiment of the present disclosure.

In some embodiments, there exists a transverse horizontal slope between the two conveyors 100. In some embodiments, at the entrance and exit of each conveyor, there exists a slab 550, which also comprises the same transverse horizontal slope. In FIGS. 3A-3B, this transverse horizontal slope is depicted with a diagonal line across the conveyors 100 and slab 550.

FIG. 3B depicts a top view of an exemplary embodiment of a conveyor system, the conveyor system comprising one conveyor 100 and one static guideway 150. In this embodiment, the vehicle's transmission is placed into neutral, such the passenger (right) side of the vehicle freely rolls on a concrete or metal surface while chocks or pucks in the conveyor belt 200 push the driver (left) side tires forward without rotating.

Figure 4A:
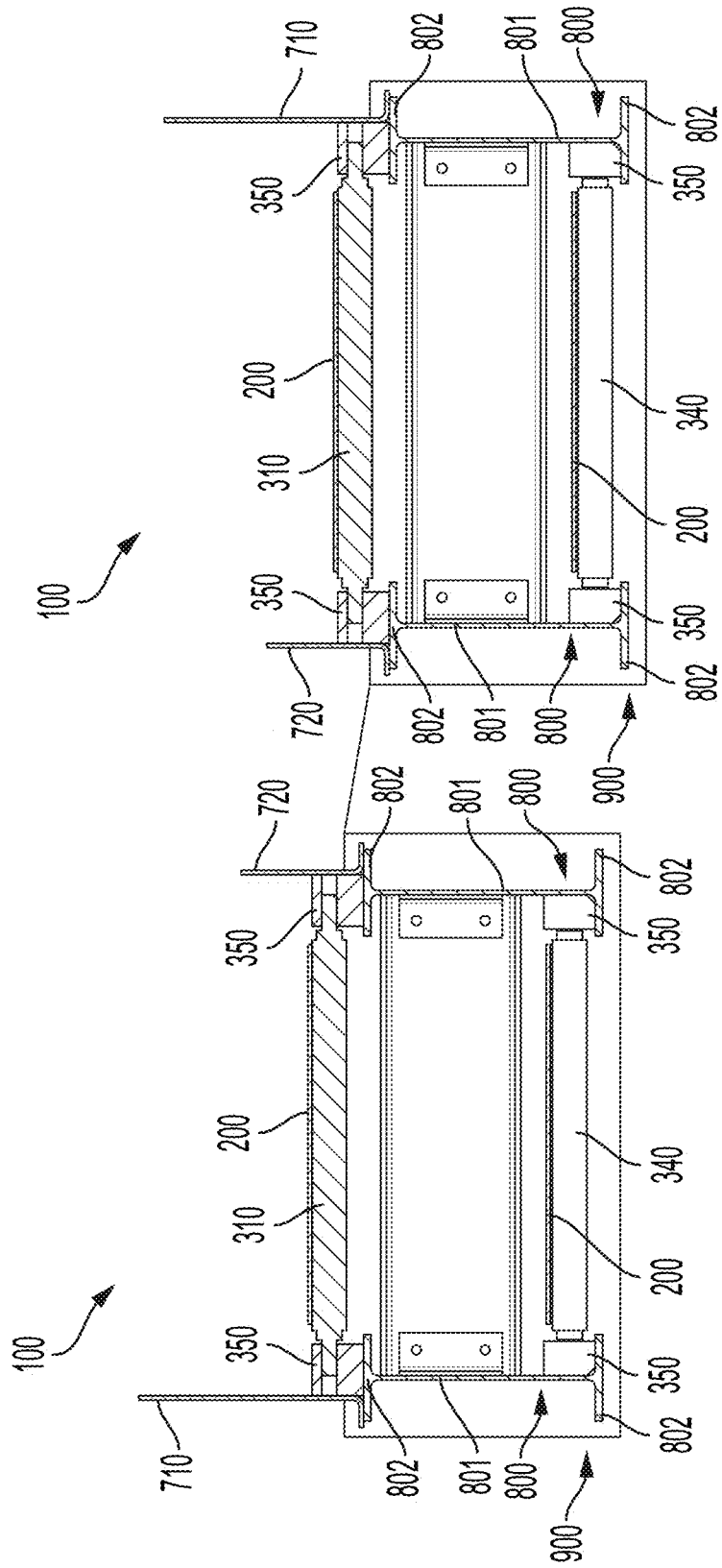
FIG. 4A depicts a transverse cross-sectional view of a conveyor system, the conveyor system comprising two conveyors, according to an embodiment of the present disclosure.

FIG. 4A depicts a cross-sectional view of an exemplary embodiment of a conveyor system, the conveyor system comprising two conveyors 100. In some embodiments, each conveyor 100 is positioned within a trench 900. Conveyor 100 may comprise a frame 800. Frame 800 may comprise at least two I-beams. Each I-beam may further comprise a web 801 and a flange 802. In some embodiments, conveyor 100 comprises bushings 350 as the roller bearings. Bushings 350 may be connected to frame 800. In some embodiments, conveyor 100 comprises idler rollers 310 and return rollers 340. Idler rollers 310 and return rollers 340 may be operatively connected to bushings 350. In some embodiments, conveyor 100 comprises a belt 200. In some embodiments, conveyor 100 comprises an inside guard rail 720 and an outside guard rail 710. In some embodiments, there exists a transverse horizontal slope between the two conveyors 100.

Figure 4B:
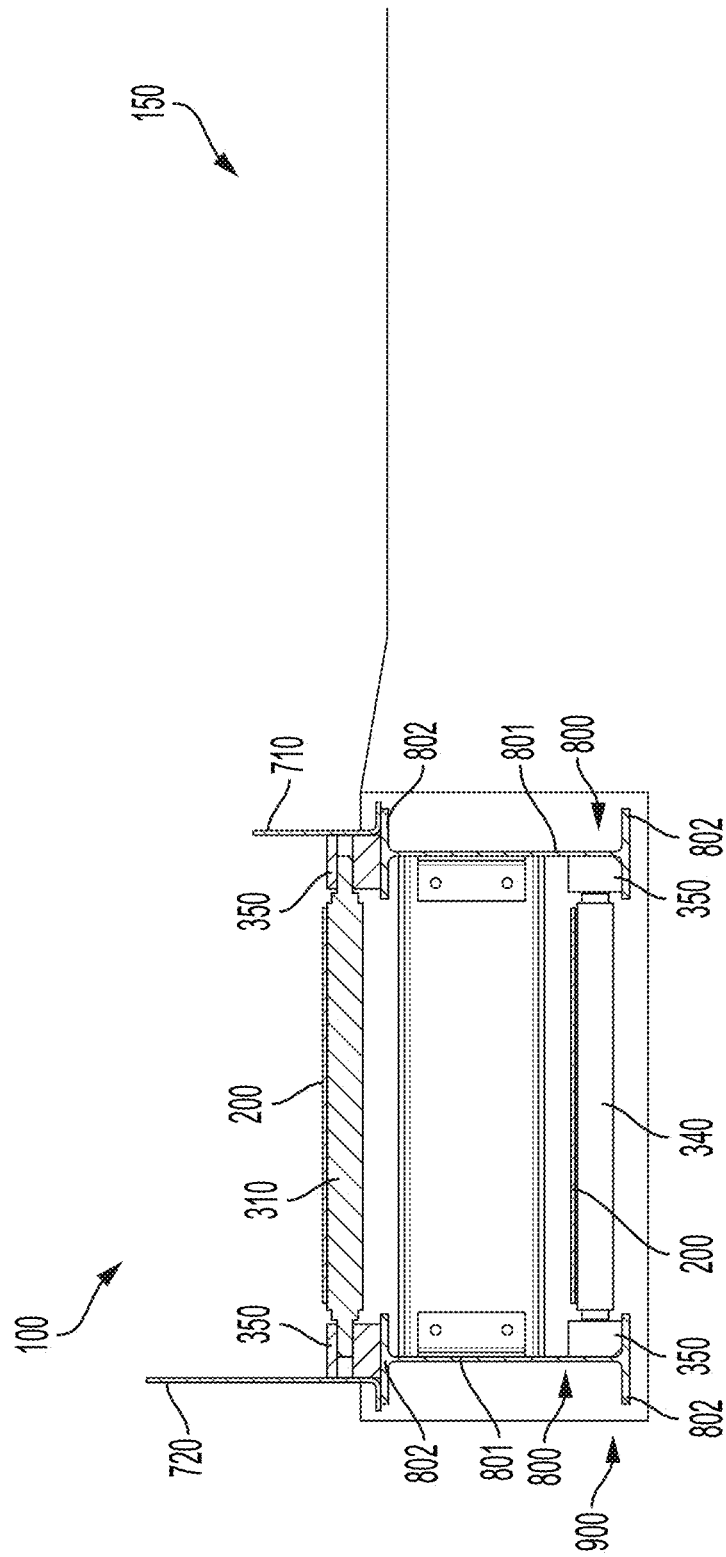
FIG. 4B depicts a transverse cross-sectional view of a conveyor system, the conveyor system comprising one conveyor and one static guideway, according to an embodiment of the present disclosure.

FIG. 4B depicts a cross-sectional view of an exemplary embodiment of a conveyor system, the conveyor system comprising one conveyor 100 and one static guideway 150. In some embodiments, the static guideway, if placed on the passenger side of the vehicle, is lower than the conveyor to simulate the crown of a road because the vehicle alignment may be configured to perform best with a crown on the driving surface.

In some embodiments, as depicted in FIGS. 4A-4B, a conveyor trench 900 houses each conveyor 100. Trench 900 allows for the collection and drainage of water and debris from the wash process. Trench 900 may be a U-shaped or rectangular cross-section and may extend longitudinally for at least as long as the length of a conveyor 100. Trench 900 is typically dimensioned to accommodate the full width and length of a conveyor 100, including any adjacent attachments, such as guide rails, with sufficient clearance to allow for the operation and maintenance of the conveyor components. Trench 900 is generally deep enough to ensure that conveyor 100 remains at or below the floor level of the facility. Trench 900 may have a sloped floor that facilitates the collection and drainage of water, dirt, and debris that accumulate during the wash process. Drainage channels or grates may be installed throughout trench 900 to direct water and debris into a connected drainage system. Additionally, trench 900 may include access points or removable panels that allow for easy cleaning and maintenance of conveyor 100.

Figure 5A:
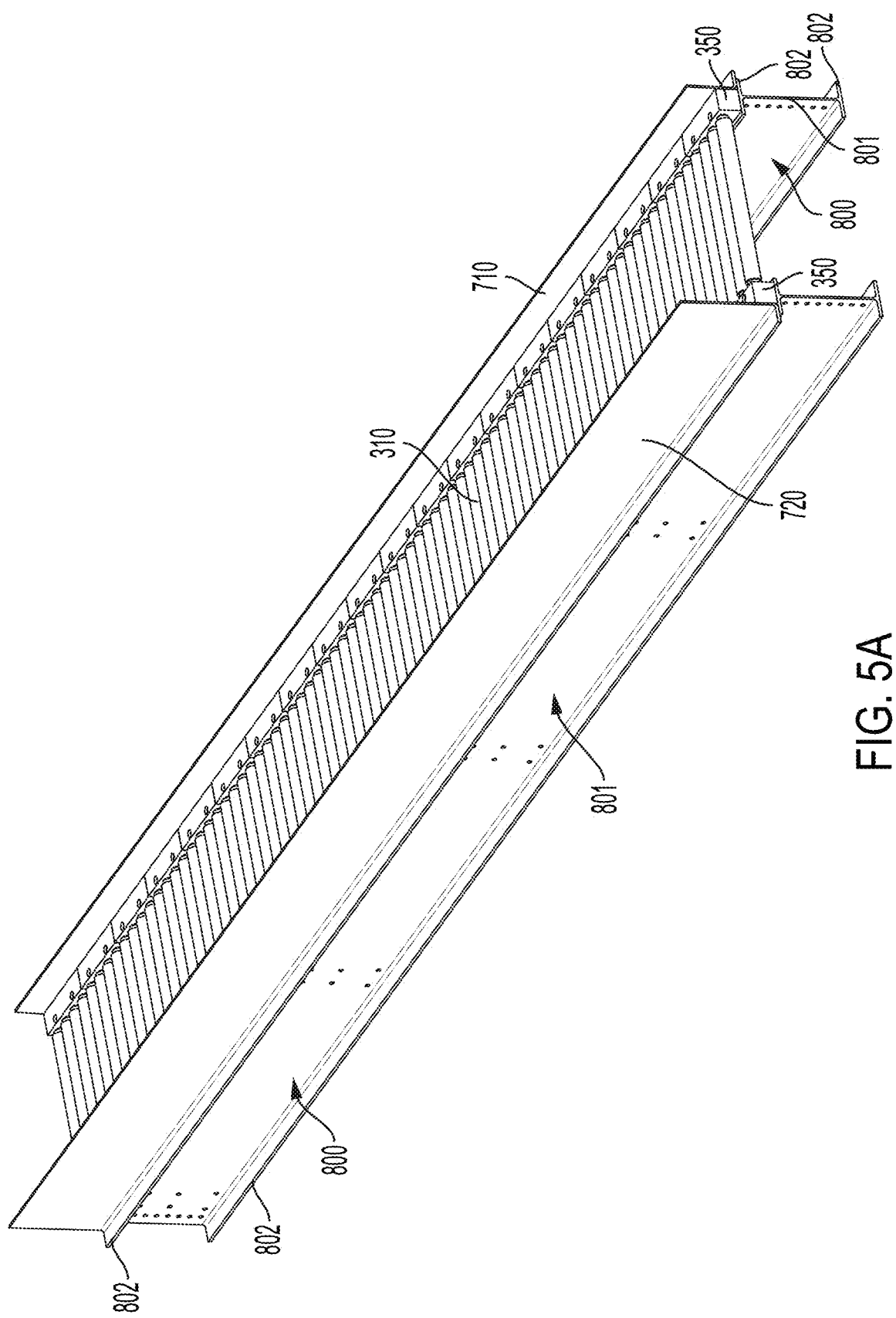
FIG. 5A depicts a perspective view of a partially constructed conveyor without the belt as viewed from above, according to an embodiment of the present disclosure.
Figure 5B:
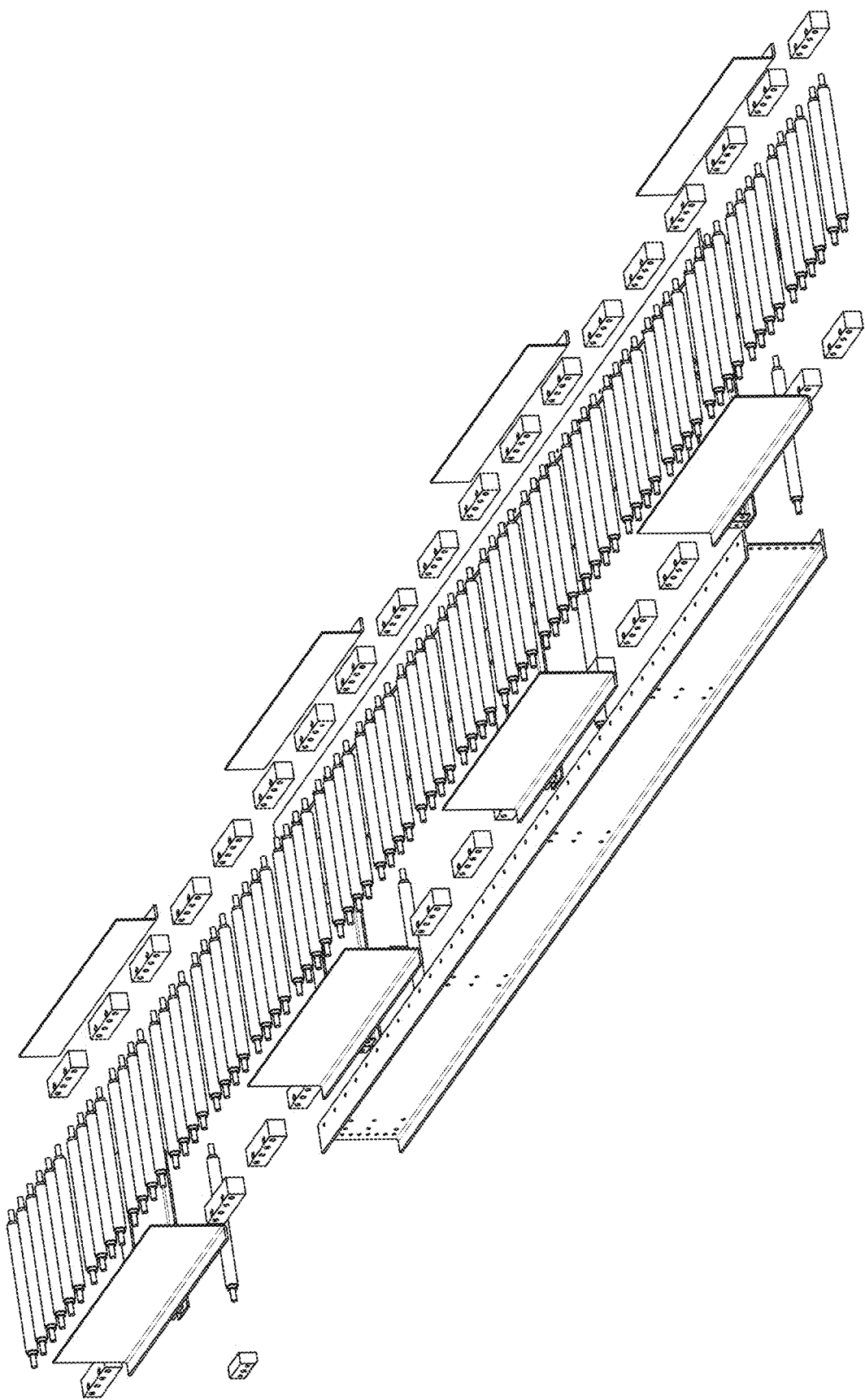
FIG. 5B depicts an exploded view of the partially constructed conveyor as depicted in FIG. 5A, according to an embodiment of the present disclosure.

FIG. 5A depicts a perspective view of a partially constructed conveyor 100 as viewed from above. In some embodiments, conveyor 100 comprises a frame 800, idler rollers 310, bushings 350, and guard rails 710 and 720. FIG. 5B depicts an exploded view of the partially constructed conveyor as depicted in FIG. 5A.

Figure 6A:
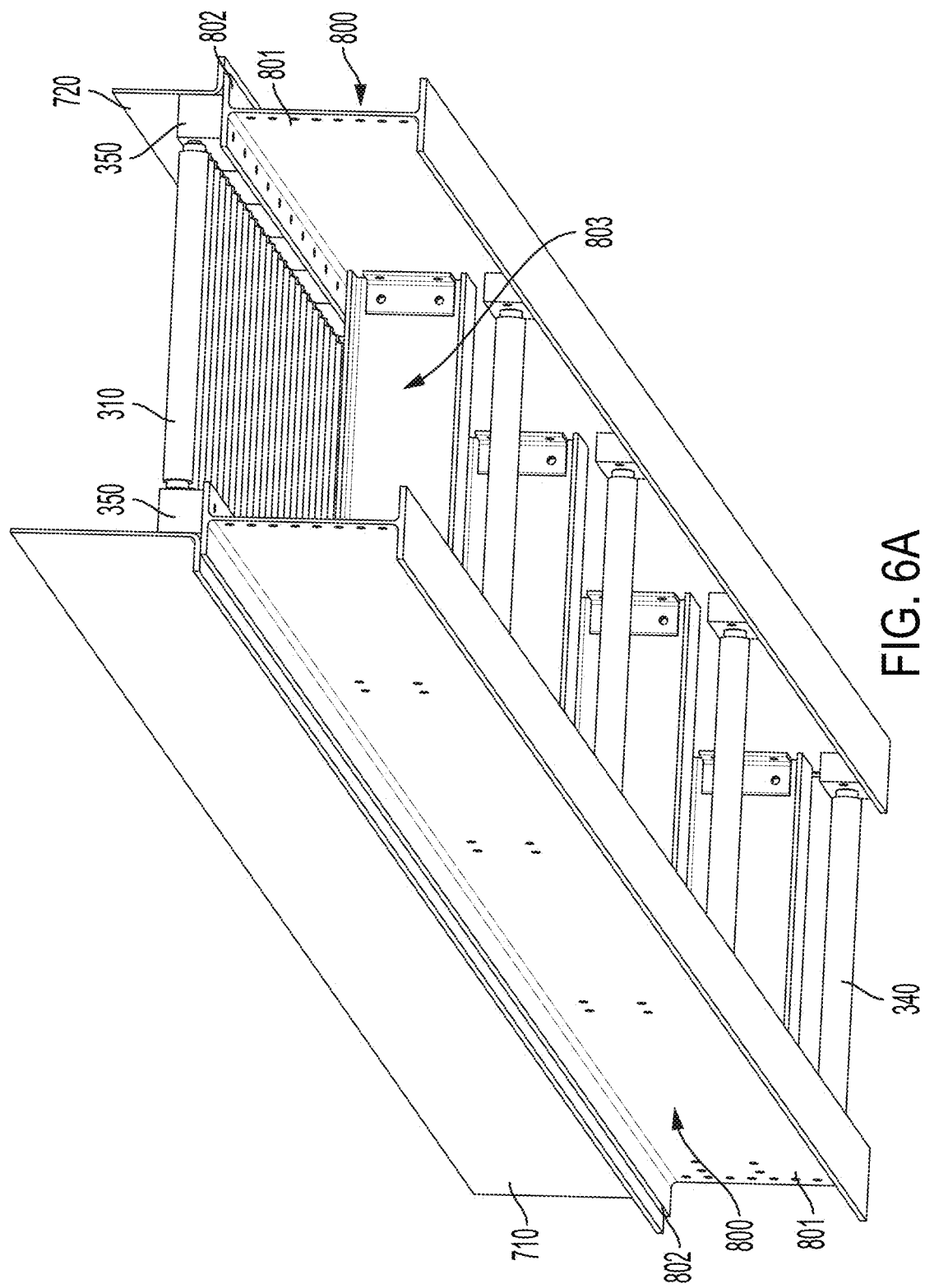
FIG. 6A depicts a perspective view of a partially constructed conveyor as viewed from below, according to an embodiment of the present disclosure.
Figure 6B:
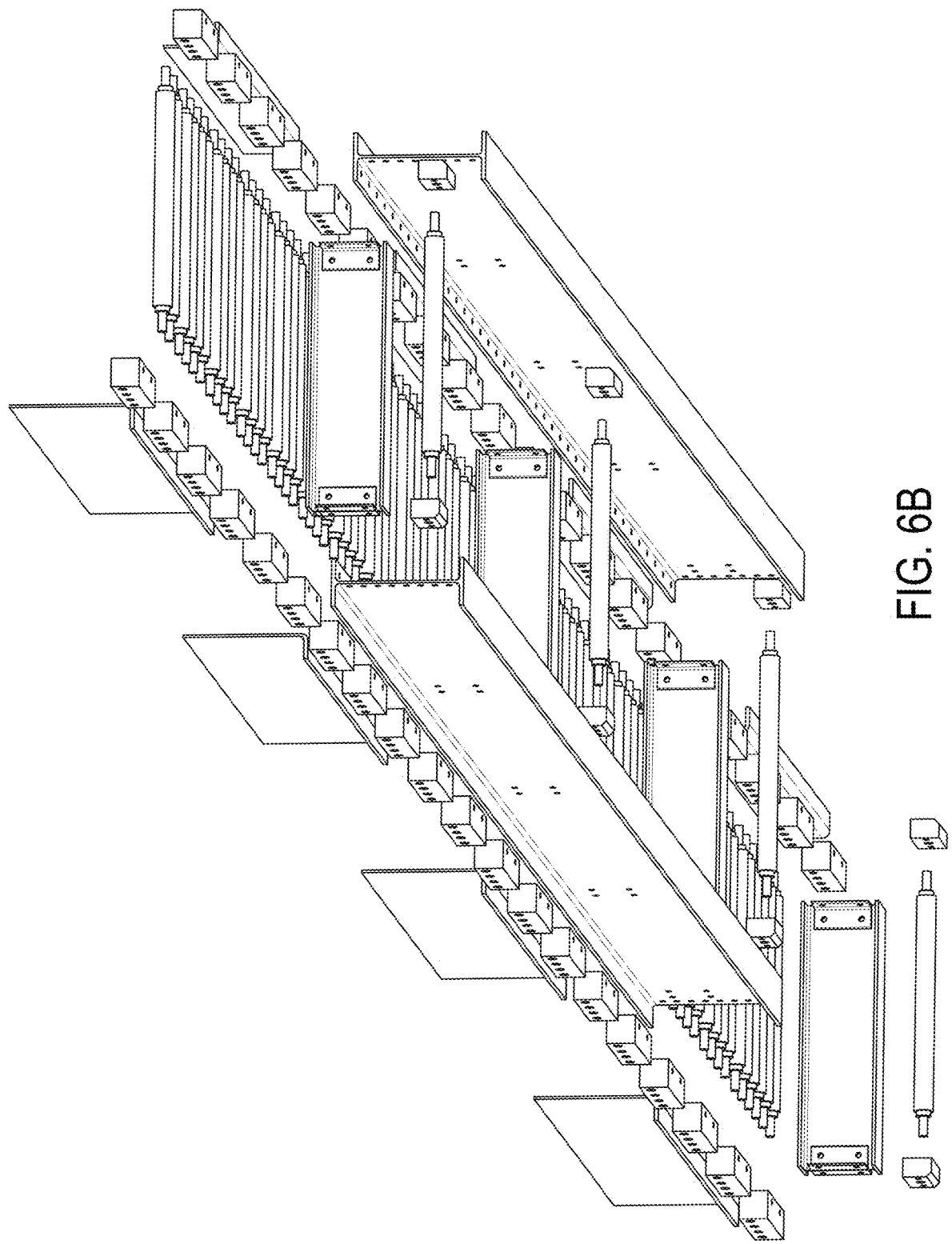
FIG. 6B depicts an exploded view of the partially constructed conveyor as depicted in FIG. 6A, according to an embodiment of the present disclosure.

FIG. 6A depicts a perspective view of a partially constructed conveyor 100 as viewed from below. In some embodiments, conveyor 100 comprises a frame 800, idler rollers 310, bushings 350, and guard rails 710 and 720. In some embodiments, frame 800 comprises at least two I-beams connected via at least one cross-brace 803. FIG. 6B depicts an exploded view of the partially constructed conveyor as depicted in FIG. 6A.

In some embodiments, each conveyor 100 comprises a frame 800. Frame 800 may be an I-beam frame 800. I-beams typically have a vertical element 801, or "web", and a horizontal element 802, or "flange." In some embodiments, I-beam frame 800 provides the structural foundation for each conveyor. These I-beams support the weight and forces exerted by conveyor belt 200 and vehicles it transports.

In some embodiments, the at least two I-beams are connected to each other at regular intervals by cross-braces 803 and/or supporting members at their webs. In some embodiments, frame 800 further comprises modular attachment points that allow for the incorporation of bushings 350, a roller deck assembly 300, and drive 320 and tail rollers 330. Frame 800 may comprise a series of attachment points along the length of each I-beam, across both the beam's flange 802 and/or web 801. These attachment points may facilitate the quick and secure mounting of various system components, including, but not limited to, bushings 350, drive systems, and guide rails. These components may be attached or detached without requiring permanent alterations to the surrounding infrastructure, making the system highly flexible and scalable.

In some embodiments, the I-beams are comprised of structural steel or an equivalent material. Structural steel may be chosen for its balance of strength, durability, and cost-effectiveness, making it well-suited for heavy loads and stresses. However, alternative embodiments can utilize different materials for said I-beams. In some embodiments, the I-beams are comprised of high-tensile steel, or an equivalent material. Frame 800 is capable of substantial load bearing and may be well-suited for a wide range of vehicles, including heavy-duty trucks and vans.

In some embodiments, each conveyor 100 comprises a frame 800 that differs from the dual I-beam structure previously described. This alternative frame 800 may comprise angle steel or iron for structural support, noted for its L-shaped cross sections, which provide considerable strength and design flexibility. This material is utilized to construct a durable frame 800 capable of supporting the significant weight and dynamic forces imparted by both the conveyor belt 200 and the vehicles being transported. The angle steel or iron's ease of assembly and inherent strength make it a viable substitute for the I-beam structures, capable of supporting the roller deck assembly 300 and bushings 350. This alternative frame design is highly adaptable, capable of being configured with various attachment points for different conveyor components. The design versatility of angle steel or iron allows for the customization of the conveyor system to accommodate an extensive range of vehicle sizes and weights.

Figure 7A:
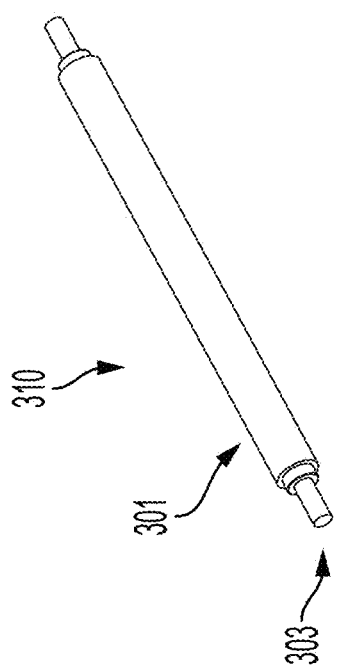
FIG. 7A depicts a perspective view of an idler roller, according to an embodiment of the present disclosure.

FIG. 7A depicts a perspective view of an idler roller 310. In some embodiments, idler roller 310 comprises an exterior cylindrical portion 301 and an interior cylindrical shaft 303.

Figure 7C:
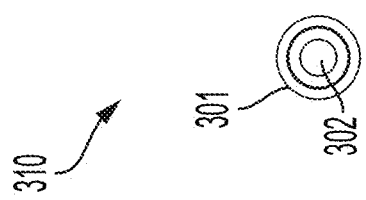
FIG. 7C depicts an end view of an idler roller, according to an embodiment of the present disclosure.
Figure 7B:
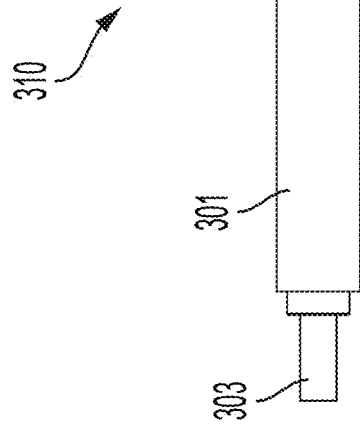
FIG. 7B depicts a side view of an idler roller, showing its entire length, according to an embodiment of the present disclosure.

FIG. 7B depicts a side view of an idler roller 310, showing its entire length. In some embodiments, idler roller 310 comprises an exterior cylindrical portion 301 and an interior cylindrical shaft 303. In some embodiments, interior cylindrical shaft 303 extrudes beyond exterior cylindrical portion 301 of idler roller 310.

FIG. 7C depicts an end view of an idler roller 310. In some embodiments, idler roller 310 comprises an exterior cylindrical shaft 301 and an interior cylindrical aperture 302.

In some embodiments, the idler rollers are positioned at intervals along the conveyor between the drive roller and the tail roller and between the upper portion and lower portion of the belt.

FIG. 8A depicts a side view of a drive roller 320, showing its entire length. In some embodiments, drive roller 320 comprises an exterior cylindrical portion 301 and an interior cylindrical shaft 303. In some embodiments, drive roller 320 is larger in diameter than an idler roller. In some embodiments, the diameter of the exterior cylindrical portion 301 of drive roller 320 is wider at its longitudinal center point relative to the diameter of its cylindrical ends. By using a crowned roller with a larger diameter at the central portion of the drive and tail rollers, the belt will naturally center itself on the rollers, even if it is deflected due to poor vehicle alignment, creating a self-tracking effect.

FIG. 8B depicts an end view of a drive roller 320. In some embodiments, drive roller 320 comprises an exterior cylindrical portion 301 and a cylindrical interior aperture 302.

FIGS. 8A-8B may also be representative of a tail roller 330, which similarly comprises an exterior cylindrical portion and an interior cylindrical shaft.

FIG. 9A depicts a partially constructed, detailed view of a conveyor, highlighting idler rollers 310 without a belt. In some embodiments, the conveyor comprises a plurality of idler rollers 310. In some embodiments, idler rollers 310 are operatively connected to a plurality of bushings 350.

FIG. 9B depicts the conveyor as shown in FIG. 9A, with belt 200 included. In some embodiments, the conveyor comprises a plurality of idler rollers 310. In some embodiments, a belt 200 is positioned on top of plurality of idler rollers 310.

In some embodiments, the conveyor system further comprises a roller deck assembly 300. Roller deck assembly 300 refers to a surface comprised of a plurality of cylindrical rollers. These rollers support vehicles traversing the conveyor. In some embodiments, the conveyor system is structured such that rollers engage selectively.

In some embodiments, idler rollers 310 may comprise a cylindrical exterior 301 with a centrally located cylindrical aperture 302 that can accommodate a cylindrical shaft 303. In some embodiments, shaft 303 may protrude from each end of the exterior. As an example, exterior 301 of idler rollers 310 may comprise a total 2-inch diameter and a 1-inch interior aperture 302 containing shaft 303. As another example, exterior 301 of idler rollers 310 may be 24 inches long, while shaft 303 may be 28 inches long, extending 2 inches outward from each side of the roller. As an alternative example, exterior 301 of idler rollers 310 may be 14 inches long, while shaft 303 may be 16 inches long, extending 2 inches outward from each side of the roller. These examples are merely illustrative, and the invention should not be limited to these specific dimensions or configurations.

In some embodiments, the rollers, including idler, drive, and/or tail rollers, may comprise a carbon steel exterior 301 with a centrally located aperture 302 that can accommodate a stainless-steel shaft 303. The material choice of stainless steel in this example is predicated upon its intrinsic attributes of wear and attrition resistance, extending the assembly's operational lifespan. This dual-material construction may allow the roller deck to withstand a wide array of mechanical stresses and strains. In some embodiments, shaft 303 may be removable from exterior 301. In some embodiments, exterior 301 and shaft 303 are welded together, and shaft 303 is secured with a set screw 313. This design allows for the easy removal and replacement of shaft 303. In some embodiments, the roller is made entirely of stainless steel, with the ends machined down on both sides to accommodate the fit into bushings 350. This construction ensures high resistance to corrosion and wear, making it ideal for harsh car wash environments. In some embodiments, stainless-steel shaft 303 is inserted into a roller comprised of ultra-high-molecular-weight (UHMW) polyethylene, plastic, nylon, urethane, polyurethane, Delrin (acetal), or Teflon (PTFE). These materials are known for their high durability, low friction, and excellent wear resistance, making these rollers particularly suitable for heavy-duty applications, where reducing friction and protecting the conveyor belt material are priorities.

In some embodiments, conveyor 100 is comprised of idler rollers 310 (which are also known as top rollers), drive rollers 320, tail rollers 330, and return rollers 340. In some embodiments, each roller—whether idler 310, drive 320, tail 330, or return 340—may comprise an outer exterior 301 and a centrally located shaft 303.

In some embodiments, idler rollers 310 are cylindrical elements distributed along the upper portion of the conveyor path. Idler rollers 310 are positioned near the upper surface of the conveyor, often referred to as the "carry side." In some embodiments, located beneath conveyor belt 200, return rollers 340 support the belt on its return path. Return rollers 340 help to maintain the belt's alignment, tension, and in preventing sagging. The purpose of these return rollers 340 is to elevate belt 200 sufficiently above conveyor trench 900, thereby reducing the chance of water accumulation in trench 900 coming into contact with belt 200. In an exemplary embodiment, return rollers 340 may be spaced at intervals further apart than idler rollers 310.

In some embodiments, some or all of the belt maintains contact with the drive roller and the tail roller. In some embodiments, the belt rotates over the drive roller and the tail roller as it is driven by the drive roller, rotating in a forward direction along an upper portion of the conveyor from an entrance end of the conveyor to an exit end of the conveyor and in a backward direction along an underside portion of the conveyor from the exit end of the conveyor to the entrance end of the conveyor.

Figure 10:
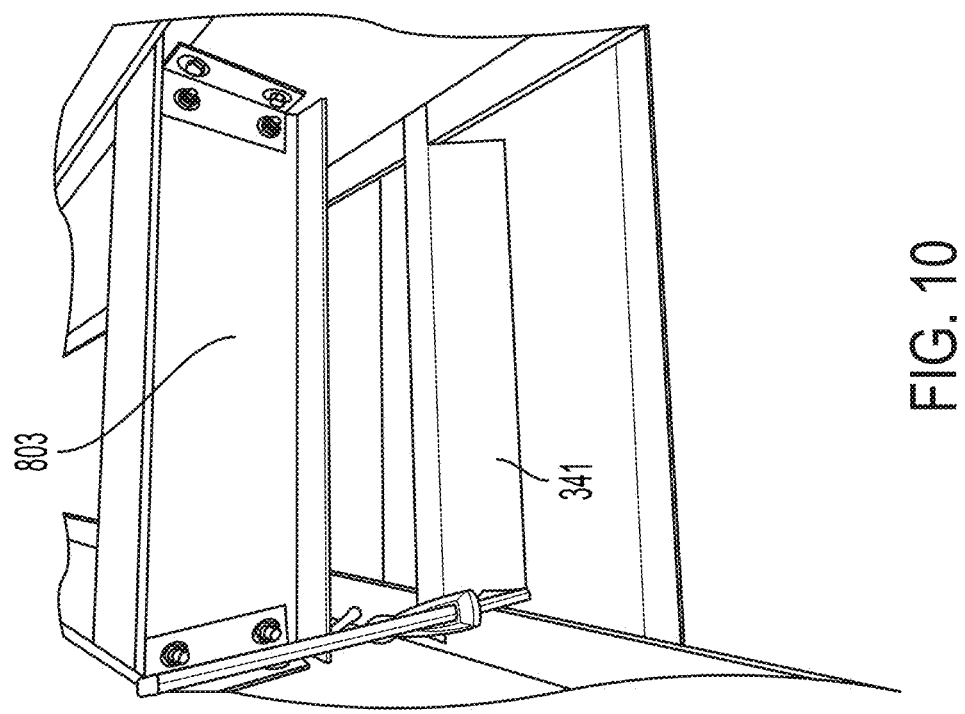
FIG. 10 depicts a conveyor frame with a plate positioned at the bottom of the frame rather than return rollers, according to an embodiment of the present disclosure.

FIG. 10 depicts a conveyor frame 800 with a plate 341 positioned at the bottom of the frame rather than return rollers. In some embodiments, frame 800 comprises at least two I-beams connected via at least one cross-brace 803. In some embodiments, instead of return rollers, the conveyor comprises a plurality of plates 341 positioned at the bottom of frame 800, such that the plurality of plates 341 function to carry the belt as it passes underneath the conveyor. Thus, instead of return rollers, bent plates of metal 341 may be connected to the lower part of the I-beam. Functionally, these plates 341 serve a similar role as the return rollers, serving as a bridge to carry the underside of the conveyor. These sheets 341 may be attached to the conveyor system's underside, bolted to the I-beam that supports the conveyor.

Figure 11:
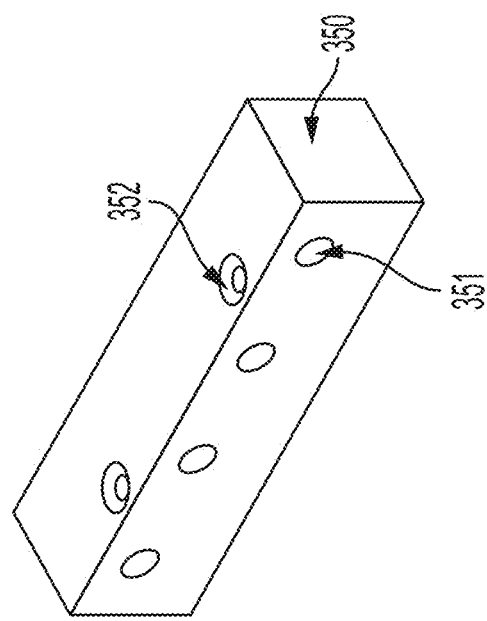
FIG. 11 depicts a perspective view of a bushing, according to an embodiment of the present disclosure.

FIG. 11 depicts a perspective view of a bushing 350. In some embodiments, bushing 350 comprises at least one side cylindrical aperture 351 on the side of bushing 350, at least one side cylindrical aperture 351 functioning to intake a roller's shaft. In some embodiments, bushing 350 comprises at least one cylindrical aperture 352 on the top of bushing 350, at least one top cylindrical aperture 352 functioning to intake a bolt to mount bushing 350 to a frame.

In some embodiments, roller shafts 303 are connected to the frame via bushings 350. In some embodiments, bushings 350 are mounted to frame 800. Bushings 350 may be attached along flange 802 of each I-beam, corresponding to the placement of the rollers. Bushings 350 can also be attached along web 801 of the I-beams. In some embodiments, bushings 350 are bolted to the frame. Bushings 350 may comprise a cylindrical aperture 352 through the top of bushing 350, through which a bolt 353 can connect bushing 350 to flange 802. These examples are merely illustrative, and the invention should not be limited to these specific dimensions or configurations.

In some embodiments, bushings 350 have at least one cylindrical aperture 351 with a diameter and a depth sized for the insertion of roller shaft 303. In some embodiments, aperture 351 is the same diameter as its associated shaft 303. For example, for each roller, the conveyor may comprise two bushings 350, such that the portions of shaft 303, one on each side of roller 300, that extend out beyond roller's 300 exterior portion 301 may fit into aperture 351 of each of two bushings 350.

In some embodiments, bushings 350 are comprised of a polymer material. In some embodiments, bushings 350 are comprised of polyethylene (PE). In some embodiments, bushings 350 are comprised of a nylon material. Polyethylene (PE) and nylon both exhibit a low coefficient of friction and superior wear resistance when interacting with the stainless-steel shaft. The inherent interaction of the PE or nylon material with the stainless-steel shaft obviates the need for routine lubrication or other frequent maintenance activities commonly associated with traditional bushing materials like metal or rubber. This is particularly advantageous in the car wash environment, where ambient moisture is generally abundant; bushings 350 utilize this moisture as a natural lubricant, ensuring smooth, uninterrupted operation of the roller assemblies.

In some embodiments, bushings 350 are comprised of a material different than nylon or PE, such as steel. In some embodiments, where bushings 350 are comprised of a material different than nylon or PE, aperture 351 further comprises a nylon or PE material within aperture 351, thereby providing reinforcement from the alternative bushing material without losing the material interaction provided by the nylon/PE bushing material.

In an exemplary embodiment, the bushing comprises a PE material characterized by several distinct properties, making it particularly suitable for high-wear applications. The PE material may exhibit a strong correlation with ultra-high-molecular-weight polyethylene (UHMW-PE), a variant that provides enhanced wear resistance, low friction, and high impact strength. The PE material may further demonstrate a crystallinity level of approximately 81.72%, which imparts superior mechanical strength and durability, allowing the bushing to withstand continuous mechanical stress over prolonged use. Additionally, the melting point of the PE material, as determined by differential scanning calorimetry, may be approximately 130.52° C., imparting thermal stability in elevated-temperature environments. These specific properties, coupled with the material's natural resistance to moisture, render the bushing particularly well-suited for use in environments such as vehicle wash roller assemblies, where exposure to abrasive conditions, humidity, and varying temperatures is prevalent.

In some embodiments, grease fittings are incorporated to address minor squeaking issues.

Figure 12:
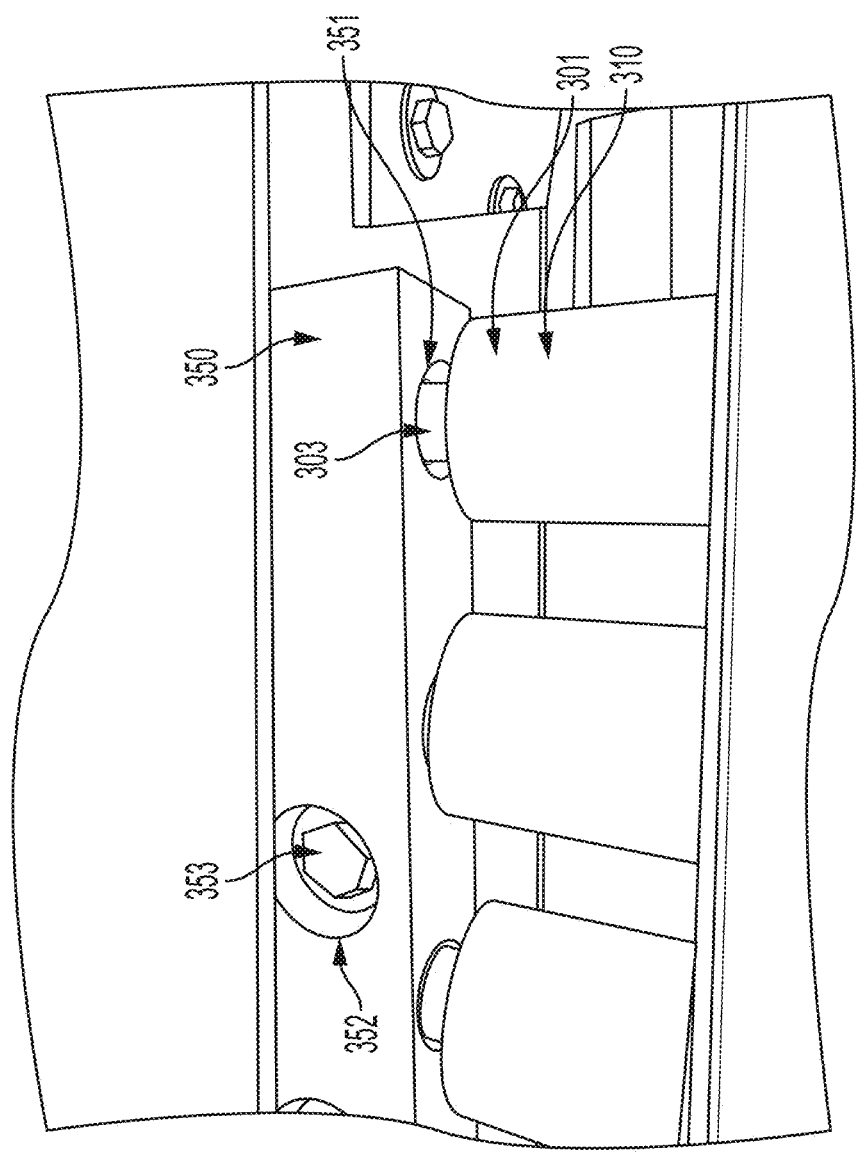
FIG. 12 depicts a detailed view of a conveyor, zoomed in to highlight the interaction between idler rollers and a bushing, according to an embodiment of the present disclosure.

FIG. 12 depicts a detailed view of a conveyor, zoomed in to highlight the interaction between idler rollers 310 and a bushing 350. In some embodiments, a plurality of idler rollers 310 are operatively connected to bushings 350. In some embodiments, idler rollers 310 comprise a shaft 303 that protrudes from the ends of an exterior portion 301 of idler roller 310. In some embodiments, shaft 303 is mounted into a side cylindrical aperture 351 of bushing 350. In some embodiments, bushing 350 is mounted to a frame via bolts 353, bolts 353 passing through bushing 350 via a top cylindrical aperture 352. In some embodiments, a belt 200 sits atop idler rollers 310.

Figure 13:
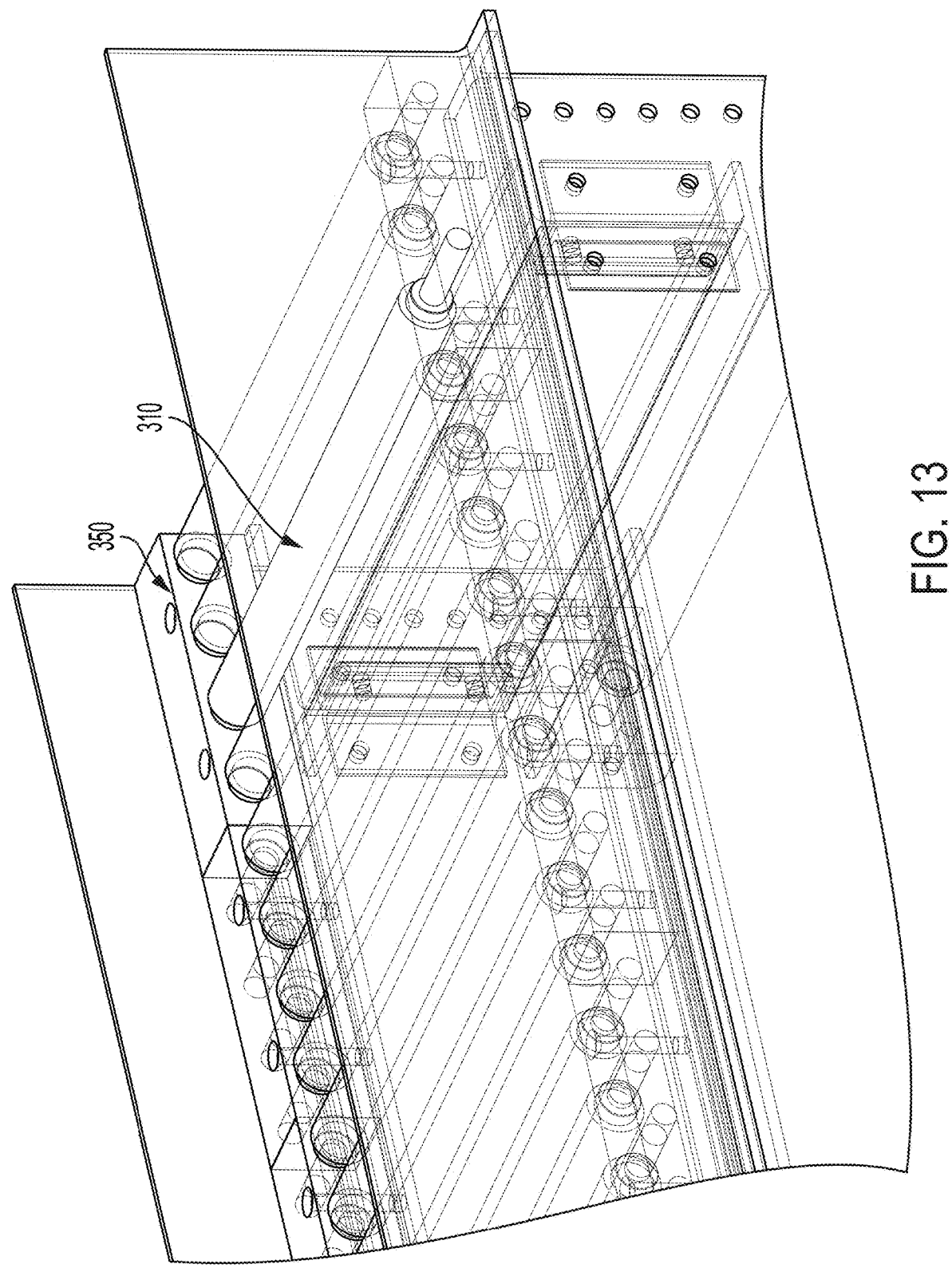
FIG. 13 depicts a partially transparent perspective view of a conveyor, where an idler roller and a bushing are non-transparent, according to an embodiment of the present disclosure.

FIG. 13 depicts a partially transparent perspective view of a conveyor, where an idler roller 310 and a bushing 350 are non-transparent.

Figure 14:
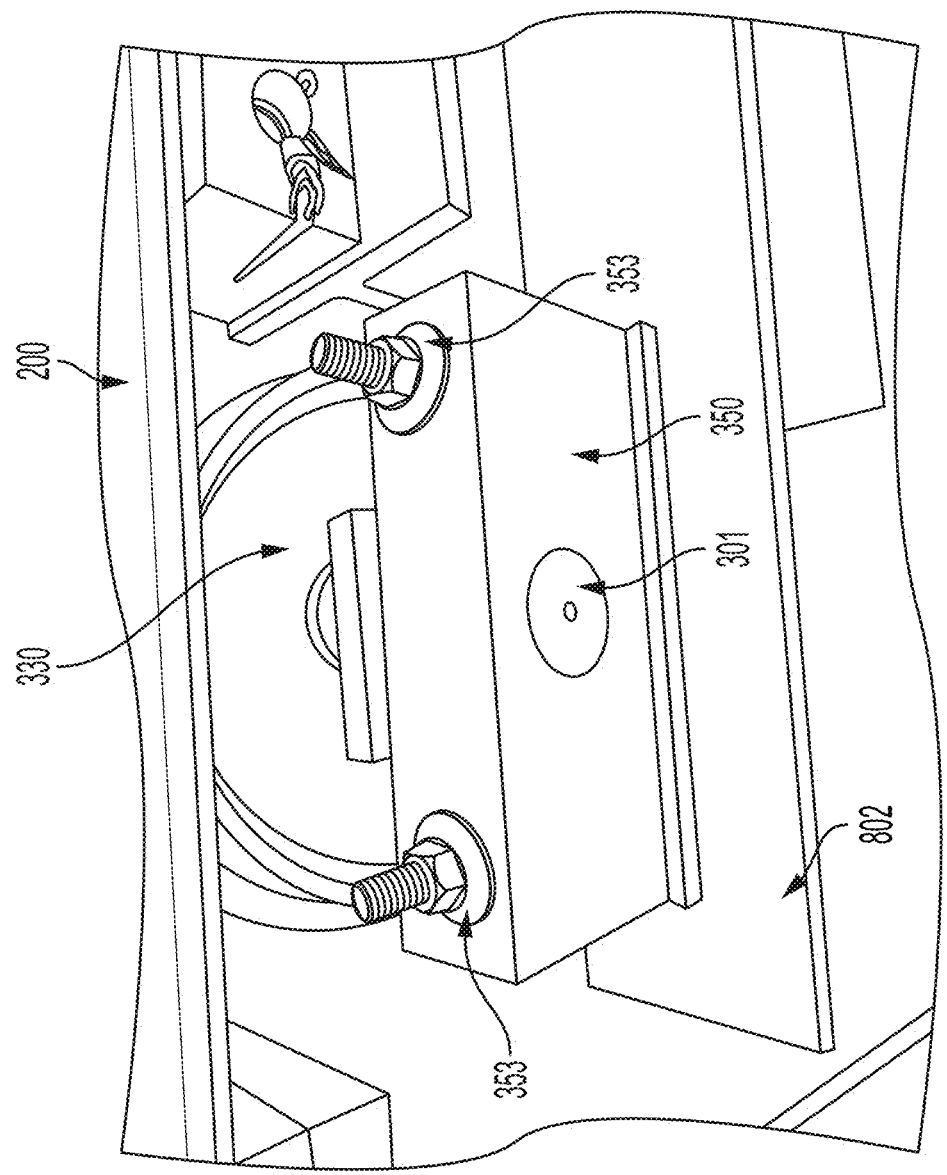
FIG. 14 depicts a detailed view of a conveyor, zoomed in to highlight the interaction between a tail roller and a bushing, according to an embodiment of the present disclosure.

FIG. 14 depicts a detailed view of a conveyor, zoomed in to highlight the interaction between a tail roller 330 and a bushing 350. In some embodiments, a tail roller 330 is operatively connected to a bushing 350. In some embodiments, tail roller 330 comprises a shaft 301 that protrudes from the end of an exterior portion of the roller. In some embodiments, shaft 301 is mounted into a side cylindrical aperture of bushing 350. In some embodiments, bushing 350 is mounted to a flange 802 of the frame via bolts 353. In some embodiments, a belt 200 sits atop tail roller 330.

Figure 15:
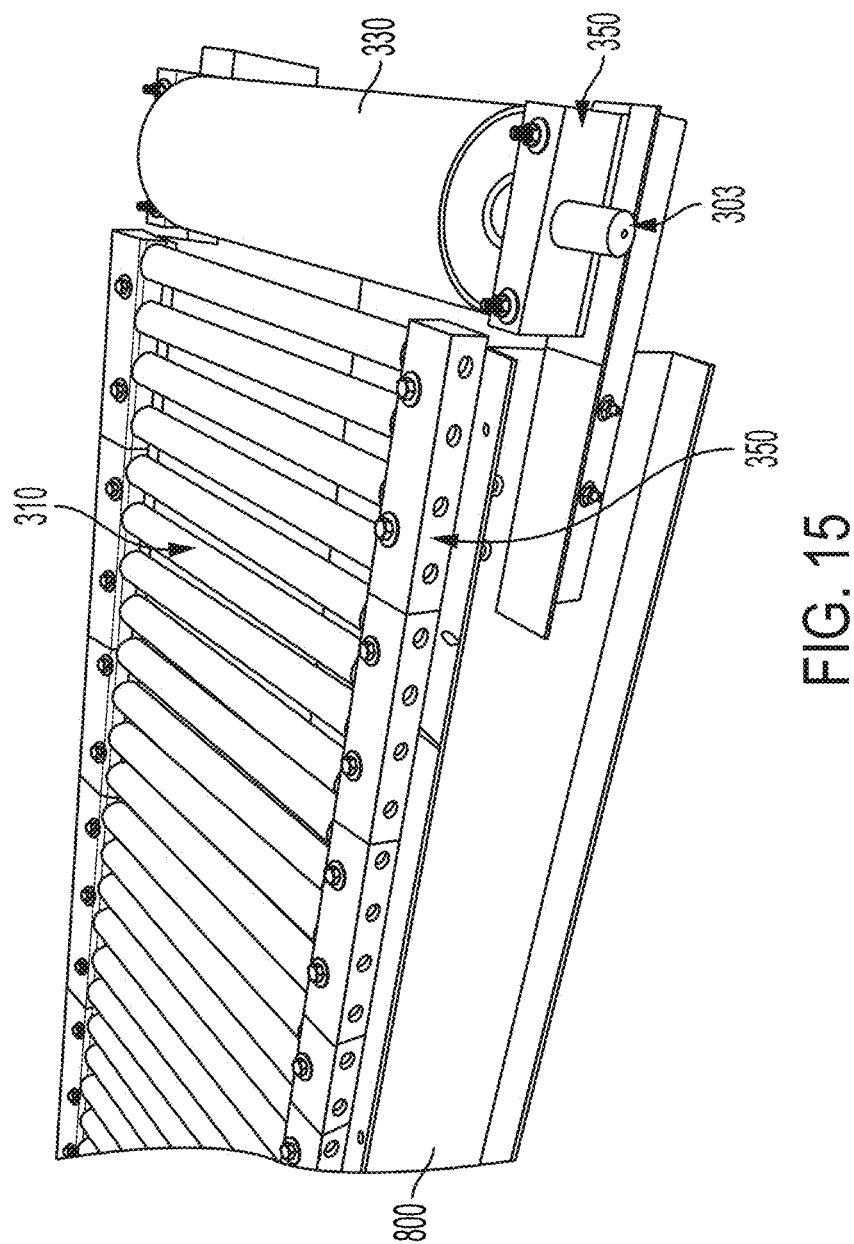
FIG. 15 depicts a partially constructed conveyor, according to an embodiment of the present disclosure.

FIG. 15 depicts a partially constructed conveyor. In some embodiments, the conveyor comprises a plurality of idler rollers 310 operatively connected to a plurality of bushings 350, wherein bushings 350 are mounted to a frame 800. In some embodiments, the conveyor comprises a tail roller 330 operatively connected to bushings 350, wherein bushings 350 are mounted to frame 800. Tail roller 330 comprises a shaft 303 that protrudes from the end of the exterior portion of the roller. In some embodiments, shaft 303 is mounted into a side cylindrical aperture of bushing 350.

Idler rollers 310 may form the upper surface of the conveyor, often referred to as the "deck", of the conveyor. In some embodiments, the deck is comprised of idler rollers 310 secured to the I-beam via bushings 350. These idler rollers 310 may be positioned at consistent intervals along the length of each I-beam. For example, the center of each roller may be separated by 3 inches, which provides close and consistent support. In alternative embodiments, the spacing between idler rollers 310 may be increased to accommodate different vehicle types or operational requirements. For instance, the rollers may be separated by greater or smaller intervals, such as 2 inches, 6 inches, 12 inches, 18 inches, or even 24 inches, depending on the desired balance between support and material use. The range of spacing allows conveyor 100 to be adapted for a variety of applications, from supporting lighter, more evenly distributed loads to handling heavier or less uniformly distributed loads. These examples are merely illustrative, and the invention should not be limited to these specific dimensions or configurations.

In some embodiments, each idler roller has a mass selected such that, under a tension and weight provided by the belt without any additional load (such as the load provided by a vehicle), a torque exerted by the belt on the idler roller is less than a breakaway torque of the idler roller, thereby preventing rotation of the idler roller when no load is present on the belt.

In some embodiments, idler rollers 310 weigh approximately 18 pounds. The weight of idler rollers 310 can vary, ranging from 10 to 25 pounds, depending on the specific application and materials used. However, these weights are merely illustrative, and the invention should not be limited to these specific weights. The weight of the roller can change with the width and length requirements of the belt. For example, a higher belt will require a heavier idler roller 310 to prevent rotation of the idler roller 310 due to frictional engagement by the belt. As an alternative example, a 14 inch wide belt would require half the weight of the roller.

In some embodiments, the load-bearing capacity of each idler roller 310 is at least to 3,000 pounds. Idler rollers 310 have been shown to support at least 14,000 pounds per foot (or across 4 idler rollers). Idler rollers 310 have also been shown to support 30,000 pounds for over an hour, with no damage to the bushing or change in its shape.

FIG. 16A depicts an exemplary embodiment of a conveyor in which a belt 200 sits atop a plurality of idler rollers 310, idler rollers 310 being operatively connected to a plurality of bushings 350. In some embodiments, two ends of a belt 200 are connected to each other by a belt connector 210.

Figure 16B:
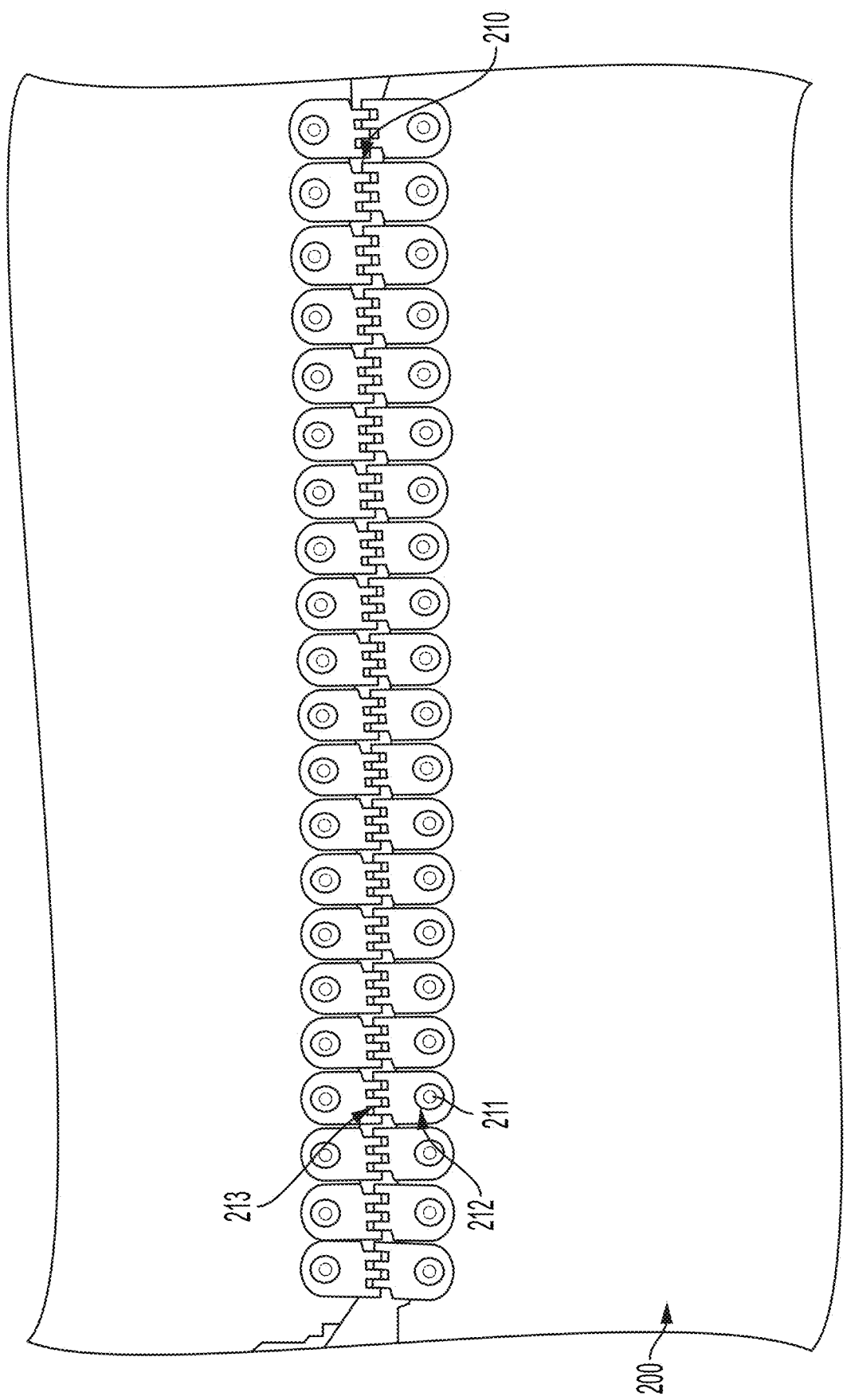
FIG. 16B depicts an exemplary embodiment of a belt connected at its ends by a belt connector, according to an embodiment of the present disclosure.

FIG. 16B depicts an exemplary embodiment of a belt 200 connected at its ends by a belt connector 210. In some embodiments, two ends of a belt 200 (or two separate belts 200) are connected to one another via a belt connector 210. In some embodiments, belt connector 210 is comprised of tabs 211. In some embodiments, each tab 211 has a solid end 212 (positioned overtop the belt 200), and a tabbed end 213, tabbed end 213 reaching out towards the corresponding tab 211 oppositely oriented on the other belt 200. In some embodiments, each tab 211 is secured to belt 200 at solid end 212.

FIG. 17 depicts an exemplary embodiment of a belt 200 wherein pucks 220 are positioned in rows across the length of the belt 200.

In some embodiments, the conveyor comprises a belt 200. Belt 200 is positioned to work in tandem with the roller deck assembly 300. This belt 200 forms the primary surface for vehicle transport. In some embodiments, belt 200 moves via rollers 300 and conforms to drive 320 and tail roller 330.

In some embodiments, belt 200 is a single swath of material connected at its two ends into a loop. The ends of belt 200 may be connected into a loop via a belt connector 210. Belt 200 may comprise multiple sections connected using belt connectors 210. Belt connector 210 may be comprised of tabs 211 on each end of the belt. Each tab 211 may have a solid end 212, found overtop belt 200, and a tabbed end 213, reaching out towards corresponding tab 211 oppositely oriented on the other end of belt 200. Each tab 211 may be secured to belt 200 at solid end 212. In some embodiments, connector 210 comprises an interlocking mechanism, where tabbed 212 end of each tab 211 engages with tabbed end 212 of a corresponding tab 211 on the other end of belt 200, thus securing the connection. In some embodiments, belt connectors 210 are comprised of stainless steel.

In some embodiments, belt 200 is comprised of a durable, flexible material, such as high-grade rubber, polyurethane, nylon, vinyl, or polyvinyl chloride (PVC). In some embodiments, belt is comprised of polyurethane, natural rubber, synthetic rubber, steel, nylon, silica, polyester, carbon black, and/or petroleum. Each of these materials—such as rubber, PVC, nylon, vinyl, and other similar materials—has been chosen for their superior durability and resistance to wear and tear, attributes that are particularly advantageous in the abrasive environment of a car wash. These choices of material stand in contrast to traditional vehicle wash conveyors that often employ plastic decks, known for their higher maintenance needs and greater likelihood of structural failure. Additionally, the material provides a high coefficient of friction, crucial for maintaining grip on vehicle tires and ensuring controlled movement through the car wash system. In some embodiments, the belt can include fiber or steel wire reinforcement.

In an alternative embodiment, conveyor belt 200 may be reinforced with fibers to enhance its strength and durability. These fibers could include materials such as polyester, Kevlar, or other high-tensile synthetic fibers, which are embedded within the rubber, polyurethane, nylon, or PVC layers of the belt. Fiber reinforcement provides additional resistance to stretching, tearing, and other forms of mechanical stress, extending the operational lifespan of belt 200.

In some embodiments, belt 200 is wide enough, along is transverse width, to accommodate a wide range of vehicles, from compact cars to large tractor-trailers. In an exemplary embodiment, belt 200 is about 28 inches wide. In another exemplary embodiment, belt 200 is about 36 inches wide. In another exemplary embodiment, belt 200 is about 12-14 inches wide. In some embodiments, the belt has a transverse width between about 12 inches and about 36 inches. These examples are merely illustrative, and the invention should not be limited to these specific dimensions or configurations.

In some embodiments, conveyor belt 200 is unhinged. The unhinged belt may be a continuous strip. The continuous nature of belt 200 allows it to twist and bend dynamically.

This unhinged aspect marks a departure from the traditional hinged vehicle wash conveyor belts that consist of interlocked, inflexible panels, which, while providing stable linear motion for vehicles with precise alignment, exhibit limitations in accommodating the lateral forces, and thus are subject to frequent breaking when deployed in car washes. Additionally, hinged belts tend to capture sand and other grime in the hinge joints, further causing early failure. The unhinged conveyor belt provides operational advantages. Its capacity to absorb and adapt to the lateral pressures exerted by vehicles leads to a reduction in belt failures. This multidirectional flexibility is essential for adapting to vehicles that do not follow a predictable linear path due to misalignment, as depicted by belt's 200 twisting capability. The integration of an unhinged belt 200 incorporates a safety margin within the conveyor system, allowing for lateral movements without compromising the vehicle's position on the conveyor within the guide rails. This design consideration further minimizes the risk of operational disruptions and belt damage, leading to a decrease in downtime and extending the lifespan of the conveyor.

In some embodiments, belt 200 is comprised of a multi-ply construction, similar to tire ply technology, which contributes to its load-bearing capacity and robustness. In an exemplary embodiment, belt 200 is ½ inches in thickness and includes a 3-ply configuration. In another exemplary embodiment, belt 200 is ⅝ inches in thickness and includes a 4-ply configuration. In another exemplary embodiment, belt 200 is ¾ inches in thickness and includes a 5-ply configuration. However, the invention is not so limited, and other thicknesses and plies may be utilized.

The various features of belt 200 may be applicable across all different configurations of the conveyor system, regardless of the number or arrangement of belts 200 implemented. This application pertains not only to single belt systems, but also to configurations of multiple belts, such as configurations of two or more, and other embodiments. Each of these embodiments can benefit from the belt being unhinged, irrespective of their unique design features.

In some embodiments, conveyor 100 comprises protrusions extending upward from the belt. In some embodiments, these protrusions are pucks 220 staggered across the belt. These pucks 220 may be made from durable materials such as high-density polyethylene (HDPE), polyurethane, nylon, ultra-high-molecular-weight (UHMW) polyethylene, rubber, or Teflon (PTFE) or metals such as stainless steel, aluminum, or brass. These materials are selected for their ability to withstand the abrasive conditions of a car wash environment, including exposure to water, chemical, and mechanical wear. In some embodiments, these pucks can be molded into the belt, welded thereto, or bolted thereto.

These pucks 220 may comprise various shapes, such as cylinders, cubes, or custom design profiles that optimize their function in guiding and pushing vehicles through the wash. In some embodiments, each puck 220 has dimensions of 1.5 inches in height and 6 inches in width, though the dimensions can be adjusted depending on the specific requirements of the wash system. Pucks 220 may be placed at intervals of every 18 inches along belt's 200 length. In an exemplary embodiment, pucks 220 are arranged in rows along belt's 200 length. In some embodiments, the pattern alternates between rows of square pucks 220 and rows of circular pucks 220. These examples are merely illustrative, and the invention should not be limited to these specific dimensions or configurations.

Pucks 220 may be affixed to the belt using methods that ensure their secure attachment, even under heavy loads and continuous operation. In some embodiments, pucks 220 are mechanically fastened to the belt using bolts or rivets that pass through pre-drilled holes in the belt material. In other embodiments, pucks 220 may be bonded to the belt using adhesives that are resistant to water and chemicals. Some pucks 220 may be molded directly onto the belt during the manufacturing process.

As pucks 220 move along the top deck of the conveyor (where the vehicles are), they help to push the vehicles through the wash, ensuring that each vehicle remains properly aligned and progresses smoothly through the various washing stages.

In some embodiments, the conveyor further comprises two large rollers at the ends of the belt. In some embodiments, the conveyor comprises at least one drive roller 320.

In some embodiments, a drive roller 320 provides the mechanical driving force to the belt and is connected to a motor through a gearbox assembly 400. Drive roller 320 may comprise a cylindrical exterior 301 with a centrally located cylindrical aperture 302 that can accommodate a cylindrical shaft 303. In some embodiments, shaft 303 may protrude from each end of the exterior. As an example, exterior 301 of drive rollers 320 may be 26 inches long, while shaft 303 may be 28 inches long, extending 1 inch outward from each side of the roller. As an alternative example, exterior 301 of drive roller 320 may be 15 inches long, while shaft 303 may be 16 inches long, extending 0.5 inches outward from each side of the roller. These examples are merely illustrative, and the invention should not be limited to these specific dimensions or configurations.

In some embodiments, drive roller 320 comprises a steel shaft 303 with a rubber exterior 303 so as to maximize friction between the belt and drive roller 320.

The conveyor's steering mechanism may be actuated by at least one drive roller 320. Drive roller 320 may be found at the point of exit or the point of entrance. In some embodiments, the conveyor may comprise at least two drive rollers 320, one at the entrance and one at the exit. In a preferred embodiment, drive roller 320 is located at the point of exit. This approach differs from the industry-standard practice of utilizing a drive roller at the point of entrance, and presents several advantages. By employing drive roller 320 as the steering actuator at the point of exit, the system achieves enhanced directional control over the conveyor belt 200. The high precision in steering becomes critically important for vehicles presenting with front-end alignment anomalies, a condition frequently observed in commercial vans and heavy-duty trucks that have been subjected to extensive wear and tear. Through this steering mechanism, such vehicles are maintained in correct alignment as they traverse through the conveyor.

In some embodiments, the conveyor comprises at least one additional large roller, sized similarly to drive roller 320, at the opposite end of the conveyor from drive roller 320. For example, if drive roller 320 is positioned near the conveyor's exit, the conveyor may comprise a passive tail roller 330 at the conveyor's entrance. The large rollers may be the same diameter as each other, or different diameters. For example, tail roller 330 (or the "entrance" roller), may be 8 inches in diameter, while drive roller 320 (or "exit" roller), may be 12 inches in diameter. These examples are merely illustrative, and the invention should not be limited to these specific dimensions or configurations.

In some embodiments, the conveyor may comprise additional large intermediate rollers spaced between tail roller 330 positioned at the entrance of the conveyor and drive roller 320. These intermediate rollers spaced throughout the middle of the conveyor prevent the belt from sagging too much onto the idler rollers by creating a portion where the belt is reelevated above idler rollers 310 in the middle portions of the conveyor. In some embodiments, each of the plurality of intermediate rollers is spaced equidistance from each other between the drive roller and the tail roller.

Tail roller 330 may comprise a cylindrical exterior 301 with a centrally located cylindrical aperture 302 that can accommodate a cylindrical shaft 303. In some embodiments, shaft 303 may protrude from each end of the exterior. As an example, exterior 301 of tail roller 330 may be 26 inches long, while shaft 303 may be 28 inches long, extending 1 inch outward from each side of the roller. As an alternative example, exterior 301 of tail roller 330 may be 15 inches long, while shaft 303 may be 16 inches long, extending 0.5 inches outward from each side of the roller. These examples are merely illustrative, and the invention should not be limited to these specific dimensions or configurations.

In some embodiments, the highest point of drive 320 and/or tail rollers 330 is elevated relative to the highest point of any of idler rollers 310. For example, the highest point of the drive 320 and/or tail rollers 330 may be 0.5 inches higher than the highest point of any of idler rollers 310.

In some embodiments, incidental torque transferred from the belt to the idler rollers can be mitigated by providing interstitial pressure plates between the rollers such that the unweighted belt glides on the plates to avoid contact between the belt and the rollers. When a heavy weight, such as a truck wheel rides on the belt, a nominal spring force that holds the pressure plate up will be overcome by the load and the idler rollers will support the weight of the load. This allows the rollers to only rotate a fraction of a turn for each wheel that travels over each roller.

In embodiments where conveyor 100 includes an upward gradient along its length, some idler rollers 310 may be raised relative to tail roller 330 to conform to this gradient. The upward gradient causes the conveyor to gradually rise as it moves from the entrance (tail roller 330) to the exit (drive roller 320) of the conveyor 100. In this configuration, idler rollers 310 are positioned in a non-horizontal plane, aligned with the inclined plane of conveyor 100. As a result, the elevation of drive 320 and tail rollers 330 is defined relative to the reference frame of the plane formed by idler rollers 310. This means that, even as conveyor belt 200 ascends along the gradient, drive 320 and tail rollers 330 may remain slightly elevated relative to the plane formed by idler rollers 310. This elevation ensures that idler rollers 310 engage and rotate only upon receiving a threshold level of downward force and weight, typically exerted by a vehicle positioned on conveyor belt 200. Conveyor belt 200, therefore, only comes into contact with idler rollers 310 directly under the vehicle's tires, minimizing unnecessary idler roller 310 rotations. This feature reduces wear and tear on both idler rollers 310 and belt 200.

In some embodiments, the highest point of drive 320 and/or tail rollers 330 may be the same height as the highest point of any of idler rollers 310. In these embodiments, conveyor belt 200 is in constant contact with idler rollers 310. However, the principle that idler rollers 310 only turn when a vehicle's tire is present on top of said idler rollers 310 remains true. This is because, due to the weight of idler rollers 310, the friction between belt 200 and idler rollers 310 is not, in and of itself, enough to cause idler rollers 310 to rotate without additional force.

As a vehicle's tire deforms under load, the contact patch or contact point—the area of the tire that makes contact with the conveyor—typically extends over a section of the conveyor that includes multiple idler rollers 310. In these instances, a vehicle's tire may span across multiple idler rollers 310, depending on the size of the tire, the load it carries, and the spacing of the rollers. This spanning distributes the load across multiple idler rollers 310, thereby reducing the stress on any single roller and enhancing the overall durability of the system. The load may not be uniformly distributed across all engaged idler rollers 310 due to factors such as the tire's shape, deformation, and the specific load distribution on the axle. Instead, the load might be more heavily concentrated on the rollers directly under the tire's central contact patch, with progressively less load on the rollers towards the edges of this patch.

For example, an idler roller 310 will only make approximately ½ turn for each tire that passes over it; for larger vehicles, idler rollers 310 may make approximately ¾ turn for each tire that passes over it. The amount of rotation that an idler roller 310 undergoes is primarily determined by the length of the tire's contact patch—the area of the tire that is in contact with conveyor belt 200 at any given time. This contact patch length depends on factors such as the tire size, tire pressure, and the load carried by the vehicle. A longer contact patch, which might occur in larger or heavily loaded vehicles, results in more of the tire's surface passing over the roller, leading to a greater amount of roller rotation.

Figure 18:
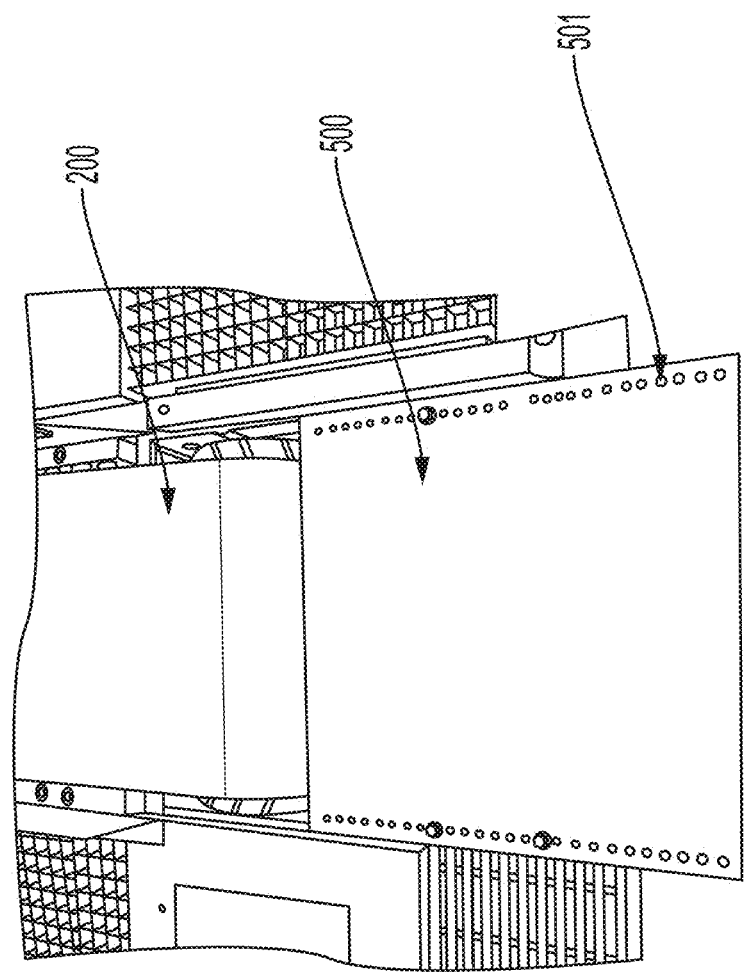
FIG. 18 depicts a detailed view of a conveyor wherein a safety plate is positioned at the end of the conveyor, according to an embodiment of the present disclosure.

FIG. 18 depicts a detailed view of a conveyor wherein a safety plate 500 is positioned at the end of the conveyor. In some embodiments, the conveyor comprises at least one safety plate 500 positioned at the entrance and/or exit of the conveyor. In some embodiments, safety plate 500 comprises a plurality of apertures 501 allowing for safety plate 500 to be bolted to the ground near the exit and/or entrance of the conveyor. Safety plate 500 helps to prevent unintentional contact with the belt return area.

In some embodiments, safety plate 500 comprises a steel plate. In some embodiments, plate 500 comprises holes 501 around its perimeter for installation into the ground. This plate is installed to ensure a clearance between the belt and the exit plate, with the exit plate positioned below. This design effectively eliminates the possibility something getting caught in the belt return space, as it guides any obstructing object onto the exit plate.

Figure 19:
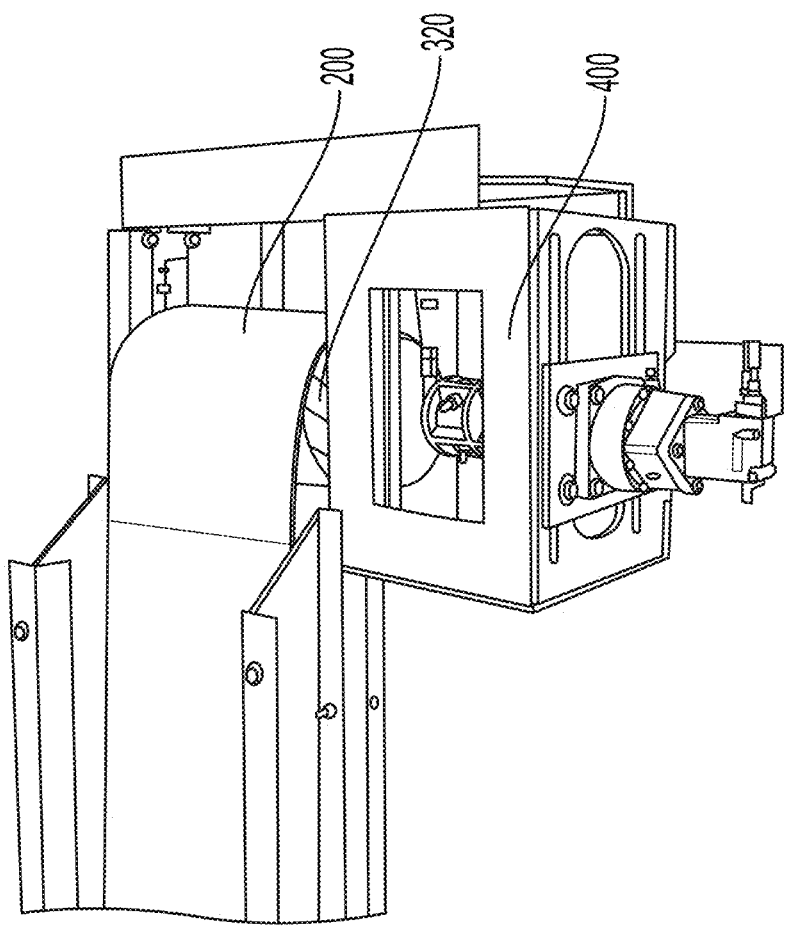
FIG. 19 depicts a detailed view of a conveyor wherein a motor and gearbox assembly are operatively connected to a drive roller, according to an embodiment of the present disclosure.

FIG. 19 depicts a detailed view of a conveyor wherein a motor and gearbox assembly 400 are operatively connected to a drive roller 320. In some embodiments, a motor and gearbox assembly 400 is operatively connected to a drive roller 320. In some embodiments, a belt 200 is positioned on top of and wraps around drive roller 320.

In some embodiments, a motor and gearbox assembly 400 may be functionally coupled to said steering mechanism (i.e., the drive roller). Motor and gearbox assembly 400 may be comprised of a motor functionally coupled to a gearbox. This assembly may be further coupled to a power pack 430. In some embodiments, power pack 430 is a hydraulic power pack. In some embodiments, the motor is electric. The conveyor can also be driven via direct electric motor and gear reducer.

This assembly may be rated to sustain load capacities of at least, but not limited to, 15,000 pounds, thereby extending the system's compatibility to encompass a wide array of vehicles, including but not limited to compact cars, dual-wheeled trucks, sprinter vans, and tractor-trailers. This drive can include, for example, a 7-horsepower hydraulic power pack 430, capable of delivering 8 gallons per minute at 1500 psi, a gearbox designed to handle 30,000 pounds of torque, a motor that delivers 8 gallons per minute, a torque coupling rated for 30,000 pounds, and a hose with a 3000-psi rating. In another exemplary embodiment, the system may comprise a hydraulic power pack 430 rated at 20 horsepower and capable of delivering 18 gallons per minute at 3500 psi. In another exemplary embodiment, the system may employ a gearbox capable of handling 50,000 pounds of torque and a motor capable of delivering 16 gallons per minute. As an example, the torque coupling may be rated to handle 50,000 pounds, and the hose 432 is rated for 6000 psi.

In some embodiments, conveyor 100 can support and transport fully loaded 80,000-pound tractor-trailers in less than two minutes. The total load-bearing capacity of the conveyor can be determined by the sum of the capacities of idler rollers 310 that are actively supporting the vehicle's tires at any given time. For example, if a vehicle's tires span across 4 idler rollers 310 on each side, and each idler roller 310 is rated at 3,000 pounds, the total capacity of these 8 rollers would be 24,000 pounds. Given that the maximum highway weight for a single axle is approximately 17,000 pounds-dividing to 8,500 pounds per side—this system can accommodate any legally weighted vehicle. The conveyor design accounts for this variability in load distribution, providing support while mitigating potential wear and tear on individual rollers.

In some embodiments, frame 800 is rated for 50,000 pounds over a 5-foot length. Consequently, the conveyor is tested to sustain the maximum weight of a fully loaded tractor-trailer, exceeding 80,000 pounds. The legal weight for a tractor-trailer is 34,000 pounds over a 10-foot length, well within the system's capacity.

The maximum load the conveyor can withstand was determined by testing its weight-bearing capacity. The test involved placing two 12-inch-long×22-inch-wide footprints on a 10-foot stretch of the conveyor. A measurement of ½ inch of stress motion at these two points in 10 feet was the maximum acceptable limit. During testing, the first movement of stress, ¹⁄₁₆ of an inch, occurred at 13,902 pounds. This demonstrates that the maximum load over an 80-foot length of the conveyor can be at least 200,000 pounds. Consequently, the system is designed to accommodate fully loaded tractor-trailers, ensuring that the washing process can be conducted without the need to unload the vehicle.

In operation, a hydraulic power pack 430 supplies pressurized hydraulic fluid to a hydraulic divider 431. Divider 431 then evenly distributes the fluid to motor and gearbox assembly 400 associated with each drive roller of the conveyors. The output of motor and gearbox assembly 400 can be finely adjusted to modify both the rate of the conveyor belt's movement and the weight capacity it can support. This control is crucial for effective cleaning, as it allows for consistent vehicle motion and speed throughout the washing process, a key advantage over traditional truck washes where speed can be inconsistent.

In some embodiments, the conveyor system comprises a gradient elevation feature, starting from the point of entry to the point of exit of the wash system. Specifically, the conveyor may have a vertical rise along the length of the conveyor system. For example, conveyor 100 may rise at a ratio of 1 inch over a span of 10 feet. This example is not a limitation; the length of conveyor 100 and the degree of its incline can be customized to meet various operational requirements. This gradient allows for vehicles to be positioned at closer intervals along conveyor 100 without risk of collision or impedance, effectively increasing the throughput and operational efficiency by enabling a higher volume of vehicles to be washed per hour. This is because, when a vehicle ascends the gradient, it encounters a force due to gravity that naturally resists forward movement. This gravitational resistance ensures that, in the absence of additional propulsion, the vehicle maintains its position or experiences a slight backward shift rather than advancing and potentially colliding with the preceding vehicle. Thus, as each vehicle traverses the gradient, a natural separation is established between it and the subsequent vehicle entering the conveyor system. This configuration helps in maintaining a safe distance between vehicles, reducing the risk of collision and optimizing the spatial utilization of conveyor 100.

In some embodiments, conveyor 100 comprises a slight transverse inclination, or "camber," across its width. This camber, slopes upward from the right side of the vehicle (e.g., the passenger side) to the left side of vehicle (e.g., the driver side), is based on principles commonly employed in road construction. In some embodiments, the angle between each conveyor 100 in a dual conveyor system, or conveyor 100 and floor under the other side of the vehicle in a single conveyor system, features a degree of inclination characterized by a 1-inch rise over a span of 60 inches. This design is akin to the "positive camber" utilized in well-engineered roads, where the difference in height between the right and left sides of the vehicle slopes upward by 1 inch across a horizontal distance of 60 inches, emulating the mild, outward slope of roads that aids in water runoff and enhances vehicle stability. This ensures that the entire conveyor system replicates the slope typically found in standard roads. The transverse camber aids in improving vehicle stability by optimizing the wheel alignment to the camber of the belt. Vehicles are often designed with variable wheel camber settings to cater to different operational conditions. These settings influence tire wear, grip, and stability. By incorporating a transverse camber, the conveyor system accommodates vehicles with diverse wheel alignment configurations, thus obviating the need for frequent manual adjustments or additional alignment mechanisms. In some embodiments, this horizontal camber is present at the pavement prior to entering the conveyor and the pavement upon exiting the conveyor. This horizontal camber allows a vehicle to pull another vehicle without risk of the misalignment between vehicles causing the other vehicle to ride off of the side of the conveyor.

Figure 20:
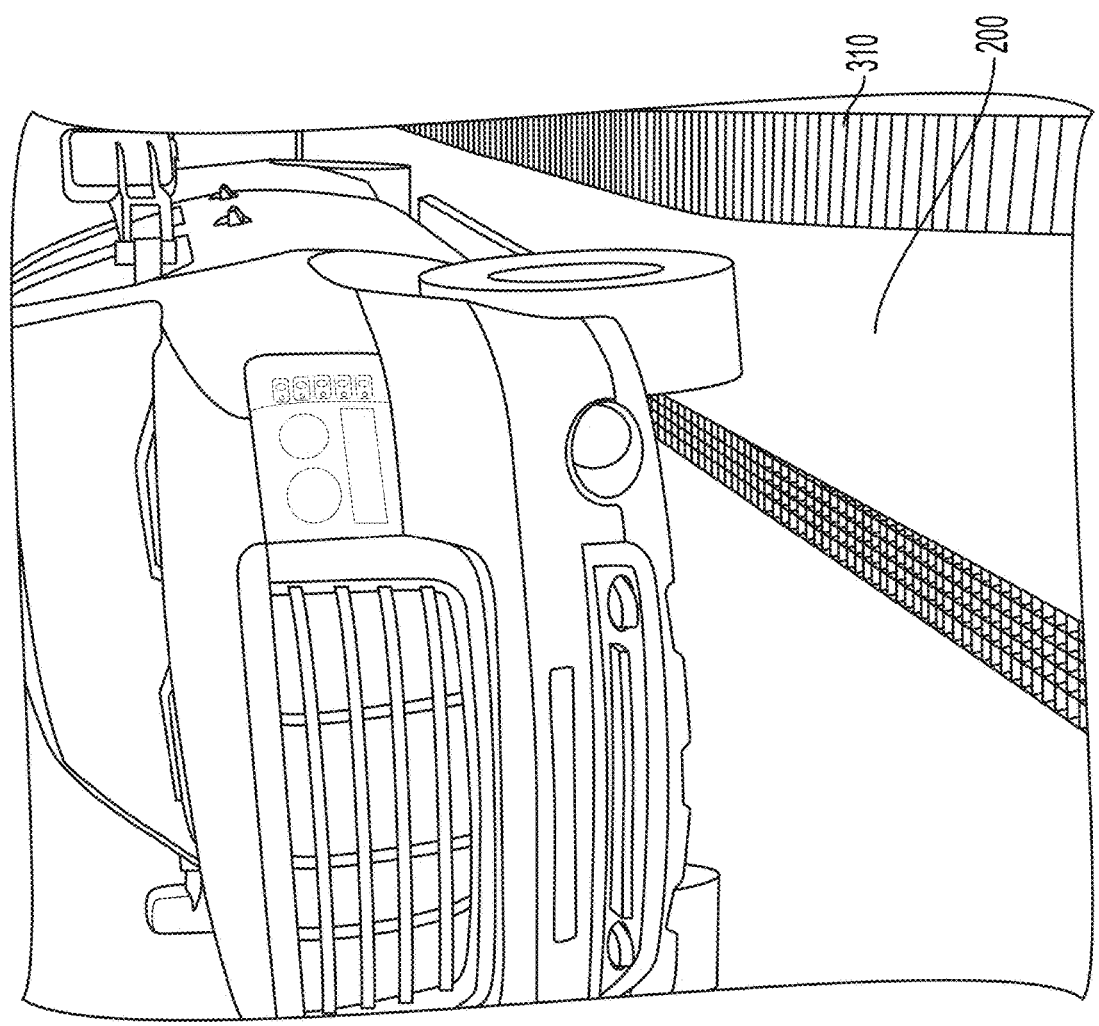
FIG. 20 depicts a front perspective view of a vehicle passing along a conveyor, the large arrow highlighting the horizontal shifting of a belt across the conveyor to compensate for the position of a vehicle's tires, according to an embodiment of the present disclosure.

FIG. 20 depicts a front perspective view of a vehicle passing along a conveyor, highlighting the horizontal shifting of a belt across the conveyor to compensate for the position of a vehicle's tires. In some embodiments, a belt 200 is positioned on top of a plurality of idler rollers 310. In some embodiments, belt 200 shifts horizontally in position across the conveyor to compensate for the position of the vehicle's tires.

Vehicle stability is enhanced by optimizing the wheel alignment to the camber of the belt. For example, a small vehicle would be set more to the right side of conveyor 100, whereas, for a larger vehicle like a tractor-trailer, the positioning would be more to the left. In one embodiment, vans or vehicles with very narrow tires would be positioned more towards the left side of conveyor 100 (or the side closest towards the wall of the wash tunnel). In some embodiments, for vehicles with poor alignment, conveyor belt 200 simply twists to accommodate the vehicle's alignment issue, and moves the vehicle through, pushing the vehicle through the wash process without any event. Belt 200 then returns to its normal position in the center of the rollers due to the combined effect of belt's 200 tension and the alignment of drive 320 and tail 330 rollers. As the vehicle exits the conveyor, the tension in the belt, which is maintained by drive 320 and tail 330 rollers, naturally pulls belt 200 back to a neutral position, centered on the rollers.

The degree of the transverse camber can range according to the specific requirements of the washing system and the vehicle types it accommodates. While a typical example may feature a 1-inch rise over a 60-inch span, other embodiments of the system could potentially exhibit a gradient anywhere from a minimal tilt, such as 1-inch rise over 240-inch span, to a more pronounced incline, such as 12-inch rise over a 60-inch span.

In some embodiments, the conveyor comprises a dual guide rail configuration that runs longitudinally parallel to the conveyor belt. In some embodiments, outer guide rails 710 run along the exterior edges of conveyor 100, providing a boundary to contain the vehicles on conveyor 100 and to guide them safely through the wash process. In some embodiments, inner guide rails 720 offer an additional interior boundary.

The guide rails may be attached to conveyor 100 at the dual I-beams. The first guide rail, or "outer guide rail," 710 may be positioned proximal to the lateral extremity of both conveyor belt 200 and the vehicle traversing conveyor belt 200. This outer guide rail 710 may serve to maintain the vehicular alignment and stability during transit across the conveyor system. The second guide rail, or "inner guide rail," 720 runs underneath the vehicle, closer to the longitudinal centerline of the vehicle traversing conveyor 100. Inner guide rail 720 is typically shorter in height than outer guide rail 710.

Both inner 720 and outer guide rails 710 are mounted onto frame 800. In some embodiments, the distance of the guide rails from the center of the belt can be adjusted to accommodate vehicles of different widths. While the default configuration is set so that the tires of a standard vehicle can pass through without contacting the guide rails, this distance can be altered as needed. The alteration involves repositioning the guide rails atop frame 800.

In some embodiments, the conveyor can accommodate a wide range of vehicle sizes. The structure of the conveyor system considers factors such as vehicle height, width, wheel size, distance from the inside of the left wheel to the outermost part of the vehicle on the right side, wheelbase, and overhang behind the back tire. In an exemplary embodiment, the conveyor system comprises an 88-inch distance from outer guide rail 710 to any fixed wash equipment. In another exemplary embodiment, the conveyor system comprises a clearance of 116 inches from inner guide rail 720 to fixed equipment. These examples are merely illustrative, and the invention should not be limited to these specific dimensions or configurations. In some embodiments, the fixed equipment sits at an "inward" position when no vehicles are present; the size of the fixed equipment allows it to accommodate both large and small vehicles, moving back for large vehicles while also having the ability to reach smaller vehicles.

In some embodiments, the conveyor system can transport vehicles efficiently through the wash using a single conveyor 100 positioned beneath the tires on one side of the vehicle. In some embodiments, the conveyor assembly comprises multiple conveyors 100. In some embodiments, the assembly comprises two distinct conveyors 100, each dedicated to a set of tires on either side of the vehicle. This dual-conveyor setup allows for balanced and stable vehicle transportation through the wash process.

In a multi-conveyor system, where conveyors are situated on both the driver and passenger sides, a transverse slope is introduced for enhanced vehicle alignment and water drainage. This slope results in one conveyor being positioned slightly lower than the other, creating a non-level configuration between the two side-by-side conveyors 100.

Further extending this concept, the system can incorporate four conveyors: two designated as loading conveyors (one for each side of the vehicle) and two as washing conveyors. Each conveyor in this configuration is tailored to specific phases of the wash cycle, ensuring optimal cleaning and handling of the vehicle. In some embodiments, the system expands to include six conveyors, integrating two additional conveyors for the departing phase of the wash cycle. This six-conveyor layout enhances the system's capability to manage different stages of washing, drying, and treatment application more effectively. Each conveyor belt in these multi-conveyor configurations is powered by hydraulically driven gearboxes and motors. In some embodiments, a single hydraulic power pack 430 facilitates the movement of the entire system, while a hydraulic divider 431 efficiently allocates the power from the pack to each individual motor and gearbox assembly 400.

In some embodiments, utilization of one, two, or three conveyors 100 in series on only one side of the vehicle may be implemented. In these single-lane conveyor configurations, conveyors 100 may be situated on either side of the vehicle, depending on the vehicle direction and structural design of the washing facility. Moreover, the adaptability of the system allows for these conveyors 100 to work in tandem or in discrete stages of the wash cycle, depending on each conveyor's specialized function.

In some embodiments, the conveyor system may comprise at least one loading conveyor. The loading conveyor is the at least one initial conveyor where vehicles are loaded into the wash system. In some embodiments, following the loading conveyor, the conveyor system may comprise at least one washing conveyor. The at least one washing conveyor moves vehicles through the core cleaning segment of the facility. The at least one washing conveyor may be surrounded by various cleaning equipment, such as spray nozzles, chemical application arches, brushes, and mitters. In some embodiments, following the washing conveyor, the conveyor system may comprise at least one departing conveyor, where post-wash treatments may be applied, and vehicles may be dried and prepared to exit the facility. The loading, washing, and departing conveyors may be powered by gearboxes connected to a power pack and a divider.

In some embodiments, flat plate sections may be positioned between the various conveyor sections. These flat plate sections serve as transition zones where a vehicle's tires can freely rotate and adjust as they move from one conveyor to the next. The inclusion of these plates is particularly advantageous at points where specific cleaning equipment, such as wheel blasters or tire treatment applications, are employed. For instance, a wheel blaster could be installed adjacent to a flat plate located between the loading and washing conveyors. This placement allows the front tires to undergo a full or partial rotation and subsequent thorough cleaning as the vehicle transitions between these conveyors. Similarly, a tire treatment application, for example, could be positioned near a flat plate between the washing and departing conveyors. This length is designed to accommodate a full or partial rotation of a tire, enabling treatment application during the drying phase. While a 60-inch length is standard for a full rotation of a typical car tire, the design of these flat plates is not restricted to this dimension; they can be customized to be shorter or longer, depending on specific operational requirements.

The system's design allows for an amalgamation of the various above-mentioned embodiments. The system can be configured with any combination of the described embodiments, depending on the specific needs and capabilities of the vehicle wash system in question. Whether operating with a single conveyor or with a multiple-conveyor layout, each embodiment optimizes the wash process according to the respective facility's constraints, vehicle requirements, and chosen washing strategies.

To effectively transmit power and motion in such a multi-conveyor setup, the system may comprise universal joints in the drive shaft. A universal joint is a mechanical connection used to join two shafts that are inclined at an angle to each other. It may comprise a cross-shaped metal piece with bearing caps at each end, allowing it to pivot in multiple directions. The universal joint can transmit rotary motion between shafts that are not perfectly aligned, thus compensating for the varying heights of the conveyors due to the transverse slope. The primary reason for using universal joints in this conveyor system is to maintain a consistent and synchronized motion between the conveyors. As the transverse slope causes a height difference, a standard rigid drive shaft would not be able to accommodate this misalignment, leading to potential mechanical stress, uneven wear, or operational inefficiency. The universal joint, however, allows each conveyor to operate at its respective height while ensuring that the movement from the drive shaft is smoothly and accurately transmitted to both conveyors. This means that despite the height difference induced by the transverse slope, the conveyors can function in harmony, with the universal joints ensuring that the rotational motion from the drive shaft is evenly and effectively distributed.

In some embodiments, situated between the loading, washing, and departing conveyors, flat plate sections provide a transition zone where a vehicle's tires can rotate and adjust as they move from one conveyor to the next. These plates can be positioned at the location of cleaning equipment designed to target rotating wheels, such as wheel blasters and/or tire dressing application.

In some embodiments, the multiple conveyors are synchronized by the power pack and divider. In some embodiments, a hydraulic power pack supplies pressurized hydraulic fluid to a hydraulic divider, which then evenly distributes the fluid to the gearboxes associated with each drive roller of the conveyors. This ensures that each conveyor operates at the same speed, allowing for consistent vehicle motion and speed throughout the washing process.

One notable advantage of utilizing a multi-conveyor approach is the reduction in belt length, which consequently minimizes the incidental torque exerted on the belts. Shorter belt lengths significantly decrease the amount of torque generated, thereby reducing wear and tear on both the belts and associated machinery. This not only enhances the longevity of the conveyor system but also ensures smoother and more reliable operation. Additionally, minimizing incidental torque can lead to more efficient power usage and reduce maintenance requirements over time. The careful organization of multiple, shorter conveyors tailored to specific phases of the wash cycle ultimately contributes to the overall efficiency and durability of the vehicle wash system.

In some embodiments, the wash tunnel comprises sheets along a static guideway 150 or the path that the passenger side of a vehicle travels along (i.e., the side of the vehicle not traversing on top of the conveyor). For example, these sheets may be ½-inch-thick×30-inch-wide. In an exemplary embodiment, these sheets are comprised of polyethylene, nylon, or stainless steel. In some embodiments, an epoxy is applied to the static guideway 150 (i.e., the side of the vehicle not traversing on top of the conveyor). This design consideration is to address vehicles with alignment issues, where the tires may not grip the concrete and steer the vehicle properly. In some embodiments, sheets are laid on the static guideway 150, which may reduce the grip of the passenger side wheel. This alignment problem is most observed with delivery trucks and sprinter vans.

In some embodiments, static guideway 150 is ground until smooth (with a floor grinder, for example) and/or epoxied. This smooth finish prevents the misalignment of a vehicle's tires-due, for example, to a driver turning their vehicle's tires—from causing the vehicle to ride off the conveyor. In this embodiment, if a driver were to turn their tires, the vehicle's tires would slide across the epoxied floor in the same direction as the conveyor.

In some embodiments, the conveyor system can be configured with various conveyor lengths to accommodate different facility sizes and operational needs. For instance, conveyor lengths may range from shorter options, such as 30 to 50 feet, to mid-range lengths of 70 to 100 feet, and even extend to longer configurations of 120 feet or more. These length options provide flexibility in designing wash systems tailored to the specific requirements of a facility, whether it focuses on high-volume quick washes or more thorough multi-stage processes. Shorter conveyors may be ideal for compact or express wash facilities, while longer conveyors allow for additional stages without the need to move vehicles between different sections manually. The system is not limited to these specific lengths, and custom configurations beyond the disclosed ranges can be implemented. In some embodiments, conveyors of various lengths, or conveyors of the same length, can be combined in a multi-conveyor system to further enhance flexibility and operational efficiency. This allows for the creation of a wash process where different conveyors may be assigned to specific stages such as loading, washing, rinsing, or drying.

Figure 21:
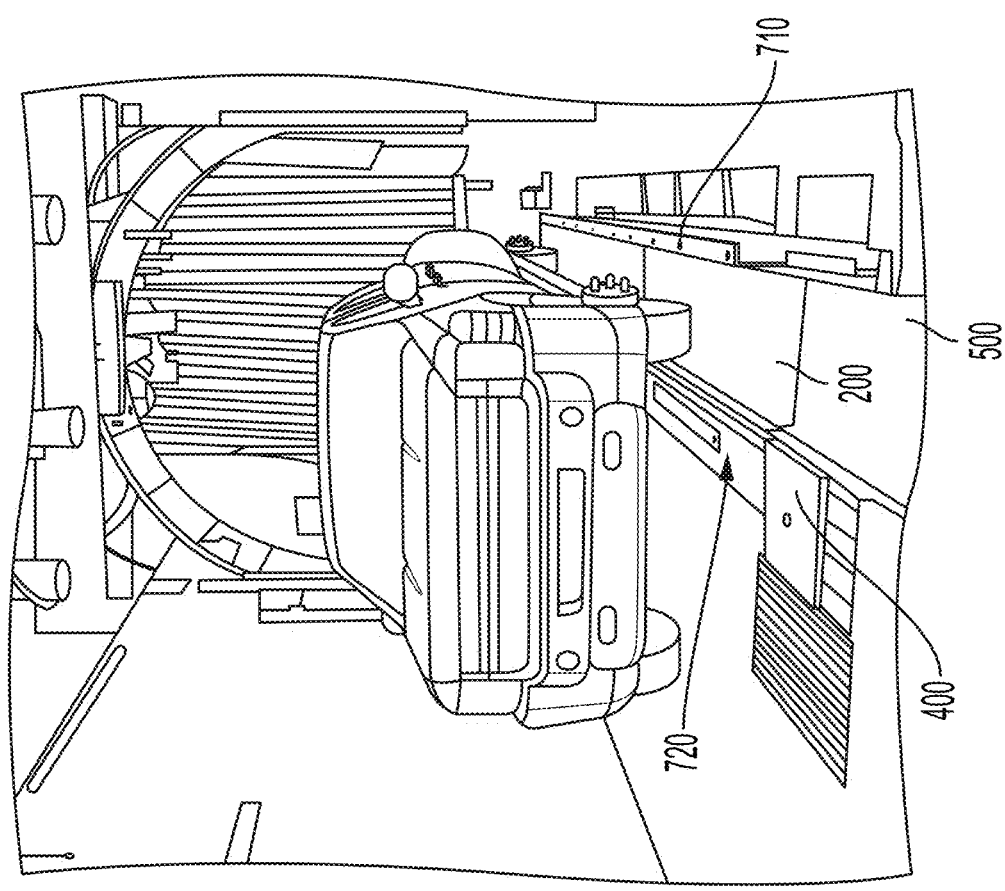
FIG. 21 depicts a front perspective view of a vehicle passing along a conveyor, according to an embodiment of the present disclosure.

FIG. 21 depicts a front perspective view of a vehicle passing along a conveyor. In some embodiments, the front end of the conveyor comprises a motor and gearbox assembly 400 and a safety plate 500. In some embodiments, the conveyor comprises an inner guard rail 720 positioned underneath the body of a vehicle passing along the conveyor. In some embodiments, the conveyor comprises an outer guard rail 710 positioned external to a vehicle passing along the conveyor.

Figure 22:
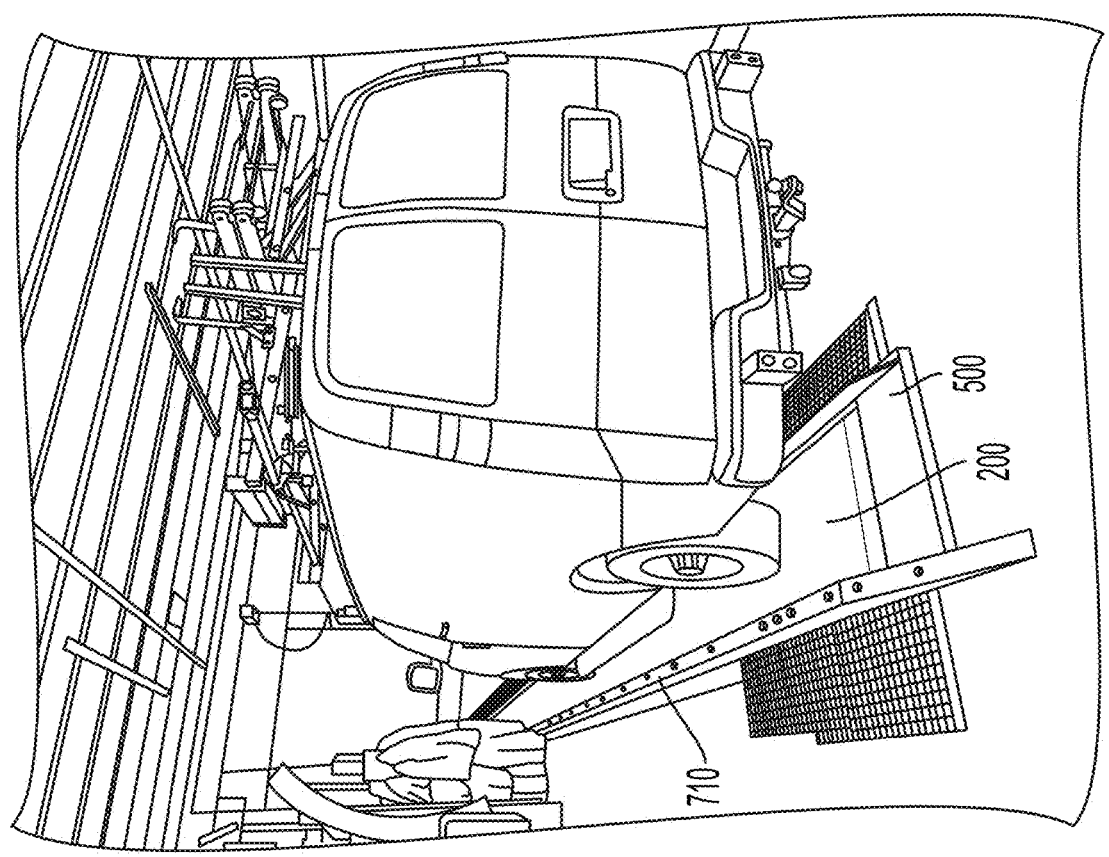
FIG. 22 depicts a rear perspective view of a vehicle passing along a conveyor, according to an embodiment of the present disclosure.

FIG. 22 depicts a rear perspective view of a vehicle passing along a conveyor. In some embodiments, the rear end of a conveyor comprises a safety plate 500. In some embodiments, the conveyor comprises an outer guard rail 710 positioned external to a vehicle passing along the conveyor.

Figure 27:
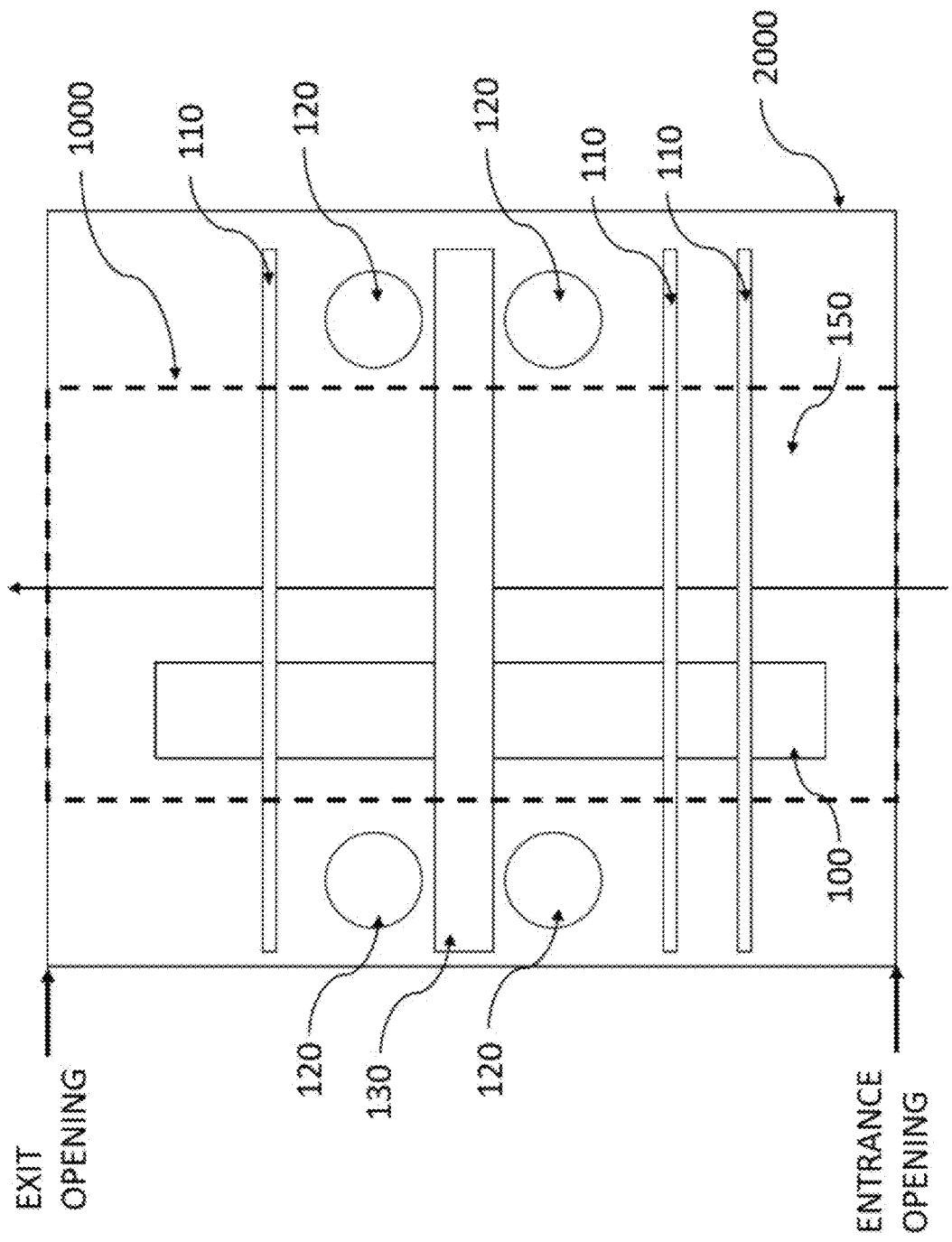
FIG. 27 depicts a top view of the vehicle wash system, including the entrance opening, exit opening, tunnel, wash pathway, conveyor, wash equipment, and static guideway, according to an embodiment of the present disclosure.

FIG. 27 depicts a top view of a vehicle wash system, the system comprising a tunnel 2000 and a wash path 1000. Tunnel 2000 is the space between the entrance and exit opening that contains all the components of the wash system, including wash path 1000, conveyor 100, static guideway 150, and various wash equipment (application arches 110, rotating brushes 120, mitters 130), and any other components. Wash path 1000 is the area within which the vehicle is conveyor by the conveyor 100 and along static guideway 150 for washing. Conveyor 100 moves the vehicle through wash path 1000, while the wash equipment cleans the vehicle as it moves along this path. FIG. 27 distinguishes between tunnel 2000, which houses everything inside it, and wash path 1000, which is the functional zone where the vehicle cleaning occurs.

Although the present invention has been described primarily in the context of vehicle wash systems for transporting cars and trucks, it is not limited to these applications. The conveyor system disclosed herein is adaptable for transporting a wide variety of vehicles and loads, including but not limited to cars, trucks, trailers, buses, boats, airplanes, motorcycles, bicycles, all-terrain vehicles (ATVs), recreational vehicles (RVs), and other wheeled or non-wheeled vehicles. Additionally, the conveyor system can accommodate vehicles and loads that are being pulled or towed, such as trailers, caravans, and other towable equipment. Furthermore, the conveyor system can be employed to transport non-vehicle loads, including but not limited to cargo containers, industrial equipment, pallets, heavy machinery, agricultural equipment, construction materials, packaged goods, and any other type of load that requires controlled movement along a conveyor path.

Wash Method

In some embodiments, the vehicle wash facility comprises a wash system. The wash system may comprise at least one dual reverse osmosis (RO) water filtration unit, temperature control mechanisms, a pulse feeder metering system allowing for control over chemical-to-water ratios, and a multi-stage cleaning process involving the application of chemical solutions with varying pH levels. The wash system may operate in conjunction with application arches equipped with calibrated nozzles for uniform chemical dispersion. In some embodiments, the wash components work as an integrated system.

In some embodiments, the wash facility is structured to accommodate both oversized vehicles and the equipment within the facility. The facility may comprise at least one oversized tunnel. The equipment may be attached to the building structure, to ensure adequate spacing for larger vehicles. The equipment may be adjustable in size to accommodate a range of vehicles.

Figure 23:
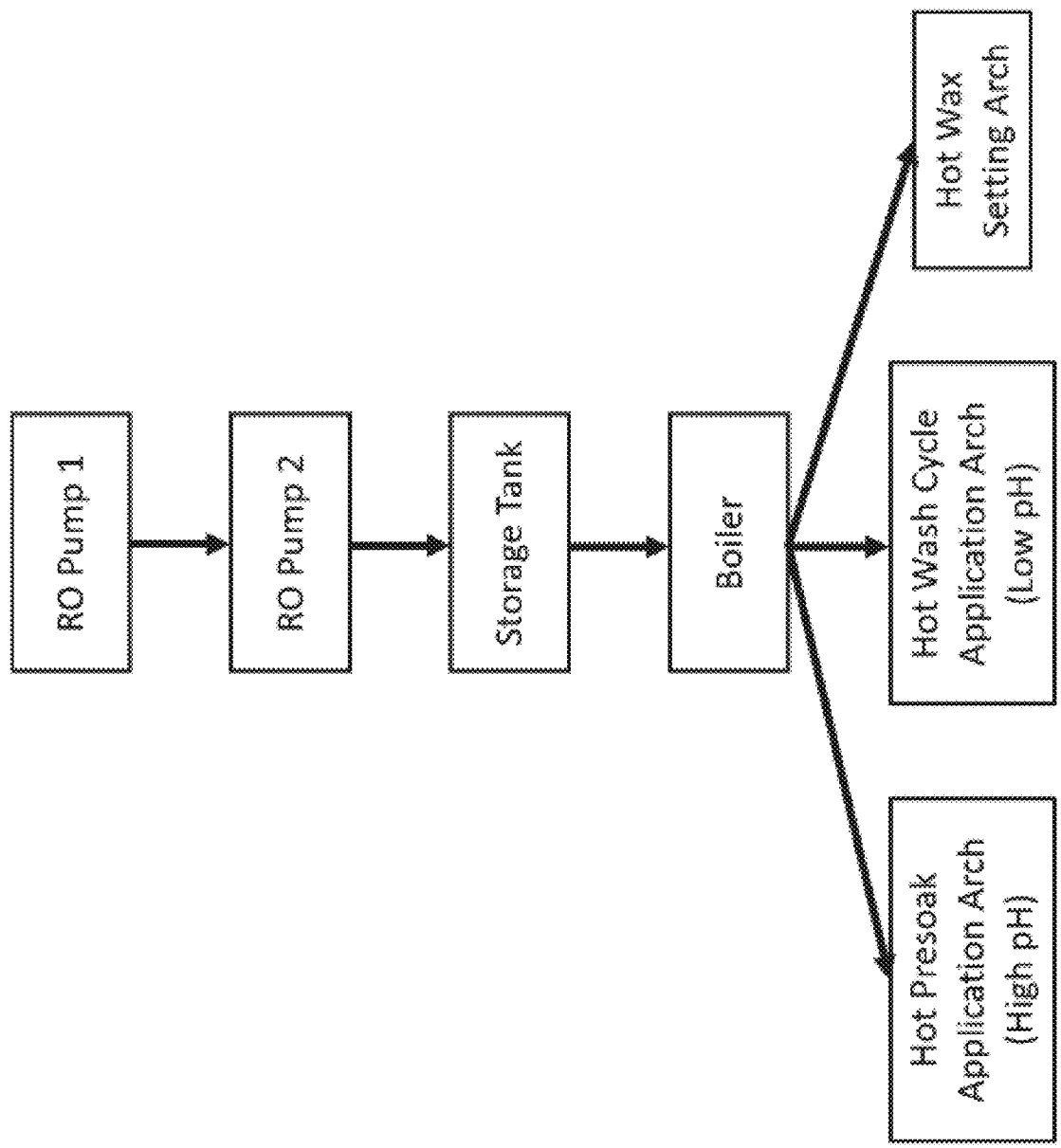
FIG. 23 depicts a schematic representation of the wash system's components involved in the multi-stage washing process, according to an embodiment of the present disclosure.

FIG. 23 depicts a schematic representation of the wash system's components involved in the multi-stage washing process. FIG. 23 includes dual reverse osmosis (RO) pumps, a storage tank, a boiler, and different application arches such as the hot wax setting arch and pre-soak arches. These components collaborate to deliver the various stages of the washing process by ensuring the water is purified, heated, and then mixed with appropriate cleaning solutions.

In some embodiments, the equipment can move manually or automatically. For example, a pressure sensor would allow the equipment arms to "feel" the size of the car and then extend outward when larger vehicles pass through the system. Additionally, the wash equipment may be positioned at specific angles for optimal performance.

In some embodiments, the wash system may comprise a water management system. The water management system can efficiently manage and recycle water for various applications within the car wash process. As an example, the water management system may intake water from a street water feed, process this street water through a first RO apparatus, direct the water output from the RO apparatus into a primary holding tank, and feed the water from the primary holding tank to a second RO apparatus. This twice-purified water can then be transferred to a pure water holding tank. From this pure water holding tank, the water may be heated and made available for various applications within the car wash process.

Figure 24:
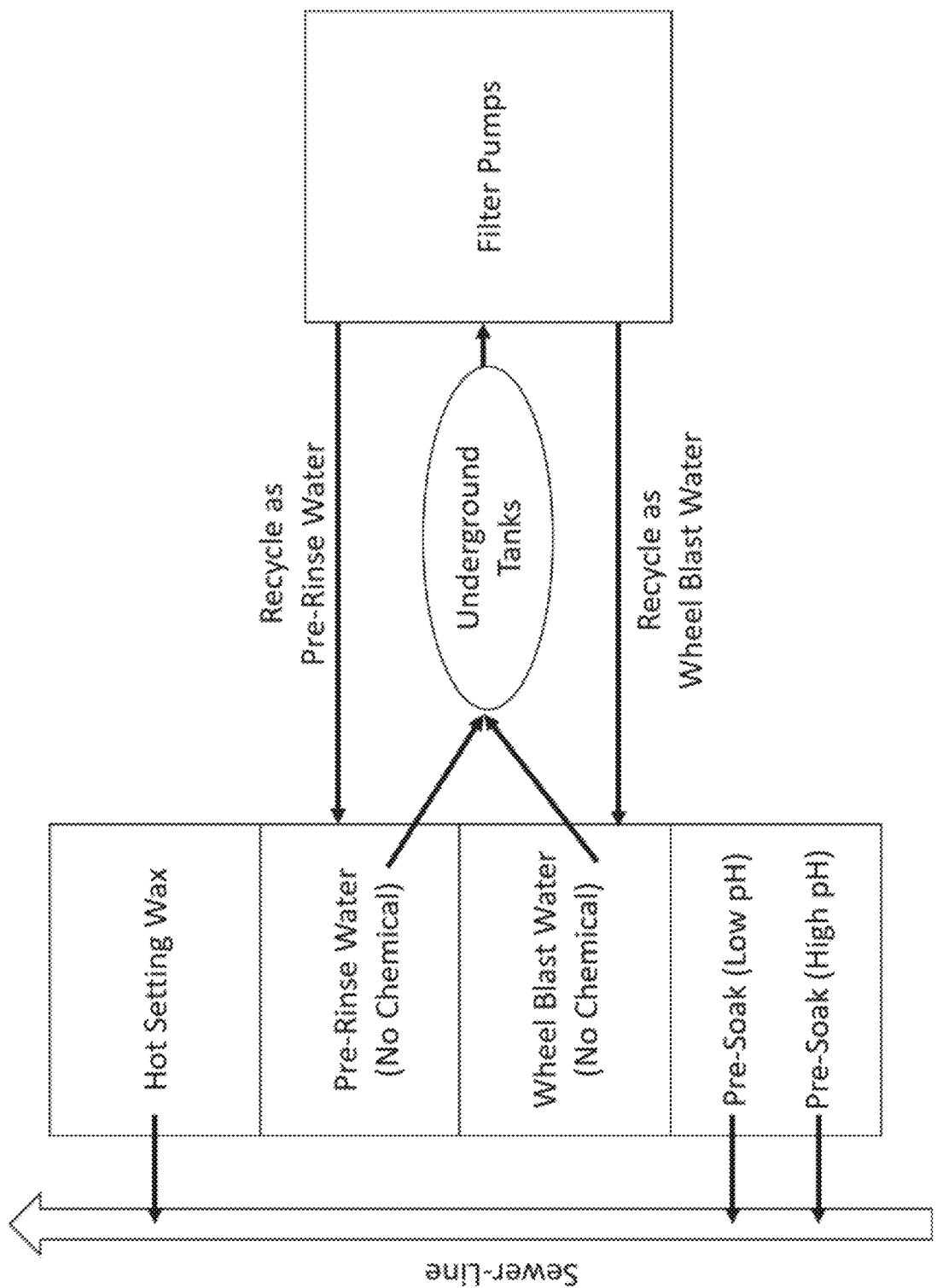
FIG. 24 depicts the water management system of the wash facility, particularly the method of recycling water used in various stages such as pre-rinse and wheel blasting, according to an embodiment of the present disclosure.

FIG. 24 depicts the water management system of the wash facility, particularly the method of recycling water used in various stages such as pre-rinse and wheel blasting. FIG. 24 depicts the division between wastewater and recyclable water. The water is collected and filtered through underground tanks for reuse.

In some embodiments, wastewater generated after different applications such as pre-soaking, wheel blasting, low and high pH washing, rinsing, and waxing may be kept separate and managed in its respective areas. For instance, pre-soak low and high pH water and wax water following their respective applications to the vehicle may be directed to the sewer.

In some embodiments, the system may comprise a method for utilizing wastewater from the RO apparatuses. The wastewater produced by the RO apparatuses may be redirected for use in a self-serve car wash. This wastewater may be stored in a separate storage tank, where it may be circulated and maintained at a temperature of approximately 120 degrees, ready for use.

In some embodiments, the wash subsystem comprises a dual RO water filtration unit to produce twice-purified water. Use of twice-purified water prolongs the water's cleaning and/or treatment efficacy. Additionally, in some embodiments, the wash system comprises temperature control mechanisms, or boilers, that regulate the application temperature of these chemical solutions to approximately 120-degrees Fahrenheit. Heated and purified water may be subsequently stored in a storage tank prior to mixing with chemicals or use.

Figure 25:
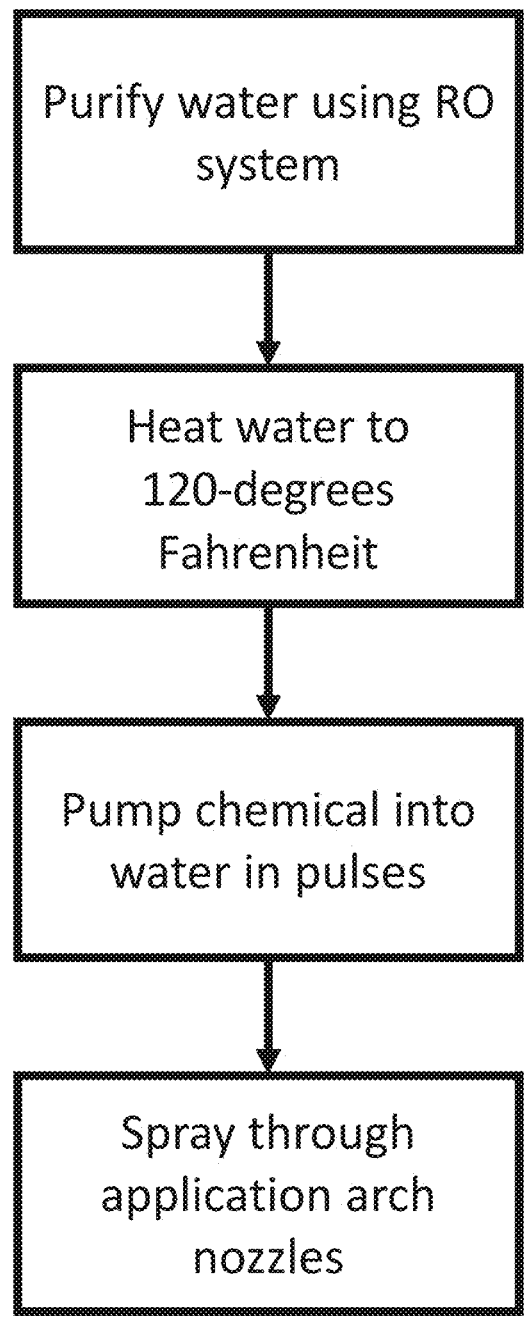
FIG. 25 depicts how water is managed and injected with chemical solutions in the vehicle wash facility, according to an embodiment of the present disclosure.

FIG. 25 depicts how water is purified, heated to 120-degrees Fahrenheit, and injected with chemical solutions using pulse feeder metering. The treated water is then sprayed onto the vehicle through application arches, ensuring accurate chemical-to-water ratios. This process highlights the metering and temperature control mechanisms that play a role in enhancing the effectiveness of the wash.

In some embodiments, the car wash system may incorporate a chemical application method. The system may employ five different wash cycles, each with properties tailored for specific cleaning objectives. The chemical solutions may include: 1) a chemical solution exhibiting a high pH level of approximately 12.5, applied at low pressure and low volume; 2) a chemical solution exhibiting a low pH level of approximately 4.5, applied at low pressure and low volume; 3) a wheel blaster water cycle that uses high volume, high pressure water (this cycle doesn't require any chemicals, just the recycling of clean, neutral pH water); 4) a pre-rinse water cycle that uses high volume, high pressure water; and 5) a neutral pH wax solution to provide a protective layer on the vehicle's surface.

Figure 26:
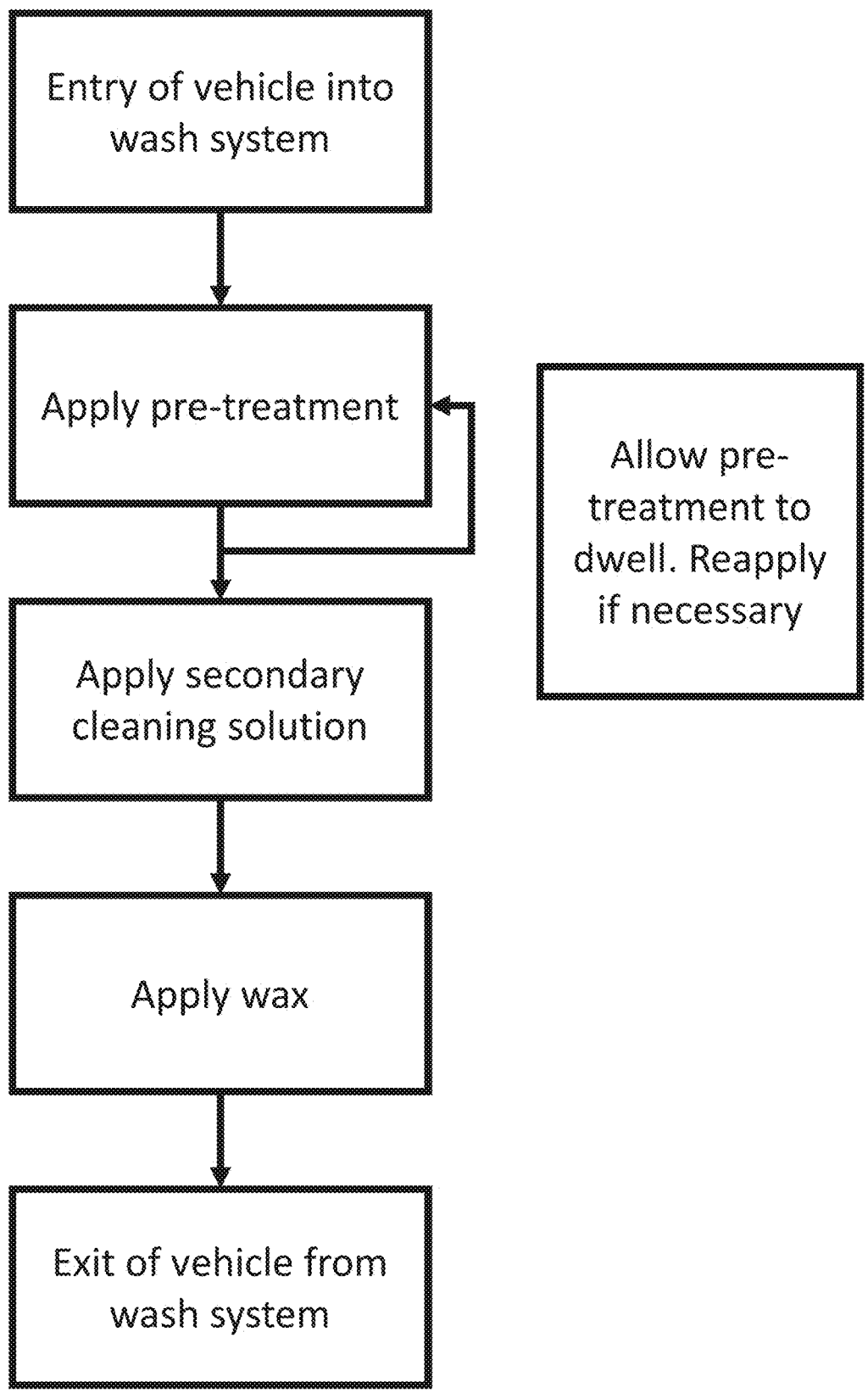
FIG. 26 depicts the overall process flow of the vehicle wash system, outlining the stages of vehicle entry, pre-treatment, secondary cleaning, waxing, and vehicle exit, according to an embodiment of the present disclosure.

In some embodiments, upon entry of an automotive vehicle in the washing facility, an initial pre-treatment stage may be conducted manually via at least one spray gun apparatus. The emitted water may be twice purified through the dual RO unit, resulting in diminished concentrations of contaminants and impurities such as sediments, chloramines, and other undesired solutes. The high-temperature, twice purified water may be mixed with a specially formulated detergent solution with a pH level of approximately 12.5. This elevated pH level is selected because of its effectiveness in solubilizing and dislodging a range of contaminants including, but not limited to soil, grease, and other compounds adherent to the vehicle surface. FIG. 26 provides an exemplary walkthrough of the described method.

In some embodiments, the duration for which the high-pH detergent remains on the vehicle surface, hereafter referred to as the "dwell time," is determined to maximize cleaning effectiveness. If the suds flatten or diminish before the vehicle progresses to the automated washing stage, this is taken as a sign that the applied detergent has been fully utilized, and a second application of the pre-treatment spray should be triggered. The dwell time can vary for each vehicle, being adjusted based on the condition of the detergent suds. This allows for the dwell time to be tailored to the degree of contaminant adhesion to each individual vehicle's surface.

In some embodiments, the detergent solution may comprise various chemicals including, but not limited to, caustic (e.g., sodium hydroxide), chelates (e.g., EDTA), nonylphenol ethoxylate (Np9), alcohol ethoxylate, sodium xylene sulfonate, sodium metasilicate, and ethylene glycol ether. These chemicals are included for their individual and synergistic properties to enhance the pre-treatment and cleaning effectiveness on the vehicle surface. In some embodiments, the detergent solution does not comprise any foaming agents.

FIG. 26 depicts the overall process flow of the vehicle wash system. FIG. 26 outlines the stages of vehicle entry, pre-treatment, secondary cleaning, waxing, and vehicle exit. FIG. 26 also depicts a side branch indicating a potential reapplication of pre-treatment if necessary, after allowing it to dwell.

In some embodiments, an application arch is utilized at secondary cleaning stages, subsequent to the initial pre-treatment stage. In some embodiments, the application arch is a square shape, a design feature that enhances clearance, accommodating larger vehicles more effectively. The application arches incorporate nozzle technology that provides uniform dispersion of a calculated mixture of the twice-purified RO water and designated chemical solutions.

In some embodiments, a high-pH chemical agent is applied via an application arch at a temperature of 120 degrees Fahrenheit and under low pressure. The high-pH chemical agent may have a pH of approximately 12.5. In some embodiments, the high-pH chemical solution may comprise various chemicals including, but not limited to, caustic (e.g., sodium hydroxide), chelates (e.g., EDTA), nonylphenol ethoxylate (Np9), alcohol ethoxylate, sodium xylene sulfonate, sodium metasilicate, and ethylene glycol ether. These chemicals are included for their individual and synergistic properties to enhance the pre-treatment and cleaning effectiveness on the vehicle surface. In some embodiments, the high-pH chemical solution does not comprise any foaming agents.

In some embodiments, following the high-pH pre-soak, a low-pH chemical agent is applied via an application arch at a temperature of 120 degrees Fahrenheit and under low pressure. The low-pH chemical agent may have a pH of approximately 4.5. In some embodiments, the low-pH chemical agent may comprise phosphoric acid and a surfactant to effectively aid in removing mineral deposits and other contaminants. In some embodiments, the low-pH chemical solution does not comprise any foaming agents.

This temperature and pressure control may be achieved through an integrated temperature control mechanism that operates with the dual RO water filtration unit previously described. In some embodiments, the chemical agents and water may be mixed in real-time, immediately prior to application onto the vehicle's surface. FIG. 25 provides an exemplary walkthrough of the process.

In some embodiments, the wash subsystem incorporates an array of metering pumps that provide accurate chemical-to-water ratio control and the real-time mixing of said chemical solutions and water. Particularly, the system may employ pulse feeder pumps to adjust the volume and frequency of the chemical pulses injected into the water stream. This means that, as water is flowing through the system, the pulse feeder pump can add controlled pulses or doses of chemical solution into the water. The pump can adjust both the volume (how much chemical is added with each pulse) and the frequency (how often these pulses occur) of these chemical injections. This allows for control over the ratio of chemical to water in the system. This mechanism allows for the metering of chemical agents into the water stream, achieving a controlled chemical-to-water ratio. Moreover, the real-time preparation of the high and low-pH chemical solutions allows the reactive potential of these chemicals to be maximized for an extended duration, providing an advantage over conventional systems that often employ pre-mixed solutions, which degrade over time.

By injecting the chemical solutions into the heated water immediately before it exits the nozzle, the chemical-to-water ratio is controlled right up to the point of application. Conventional systems generally require greater volumes of water to ensure the dilution and dispersion of chemical agents, often resulting in waste and less-than-optimal cleaning outcomes. In this specific embodiment, the insertion of chemicals at a certain point in the system, facilitated by the pulse feeder pumps, allows the wash system to maintain the efficacy of the chemical solutions. The pulse feeder pumps control the amount and timing of the chemical injections. This feature is distinct from conventional methods, particularly those that employ static pumping systems. Such existing systems lack the capability to dynamically adjust chemical-to-water ratios in response to real-time conditions, which often results in either chemical wastage or inadequate cleaning.

In some embodiments, the vehicle advances through a pre-rinse stage following the chemical cleaning at the application arches.

In some embodiments, a setting arch is utilized at a waxing stage subsequent to the secondary cleaning stage. In some embodiments, following the chemical cleaning and pre-rinse stages, the vehicle advances to a terminal waxing stage. The secondary cleaning is facilitated by a specialized setting arch, which applies a neutral pH wax solution to the automotive vehicle. Unlike conventional systems that may utilize room-temperature or variably controlled wax, a temperature control mechanism maintains the wax solution at a consistent 120-degree Fahrenheit throughout the application process.

The purpose of this temperature control is twofold. First, maintaining the wax at 120 degrees Fahrenheit enhances its fluidity, ensuring that the application is uniform across all surfaces of the vehicle. Second, the elevated temperature boosts the adhesion of the wax solution to a vehicle's clear coat finish. This ensures the formation of a protective layer, thereby providing a level of surface protection against environmental elements such as UV radiation, rain, and road grime.

In some embodiments, the wax solution may comprise mineral seal oil, a surfactant, and ethylene glycol monobutyl ether (commonly referred to as "EB solvent"). These components are selected for their properties that enhance the protective and aesthetic qualities of the wax application. Mineral seal oil provides a robust protective barrier, the surfactant ensures even distribution of the wax, and the EB solvent aids in the solubilization and effective application of the wax solution at the maintained temperature. In some embodiments, the wax solution does not comprise any foaming agents.

In some embodiments, the setting arch comprises both a square shape and nozzle technology, similar to the application arch used in the secondary cleaning stage. The square shape is a modification made specifically to accommodate larger vehicles, such as sprinter vans, or trucks with equipment mounted on their roofs. Similar to the application arch, the setting arch operates in tandem with the temperature control mechanism.

In some embodiments, the car wash system incorporates a specialized process for cleaning vehicle wheels. In some embodiments, the system comprises a stainless-steel plate into which multiple holes have been drilled. Each of these holes houses a high-pressure jet, similar to those found in power washers. During operation, the stainless-steel plate is positioned close to the wheels of the vehicle as it moves through the car wash. As the vehicle progresses through this stage of the wash, the high-pressure jets blast water into the wheels, effectively removing dirt and other contaminants.

In some embodiments, the oversized tunnel wash may also incorporate a pay station, a WBC controller, a keypad, and a hydraulic pulse.

Example Use Case

The following example use case describes how an example of a vehicle wash conveyor according to the present disclosure may be used. This section is intended solely for explanatory purposes and not for limitation.

As a vehicle approaches the car wash facility, it encounters the entrance pavement designed with a transverse slope. This slope functions to align the vehicle with the loading conveyors. The loading conveyors are positioned to support the tires on each side of the vehicle. Activation of the loading conveyor may be controlled by hydraulic solenoids, which may help to synchronize the movement of the loading conveyor with the subsequent conveyors in the system.

The vehicle, once properly aligned and situated on the loading conveyor, starts traveling through the car wash. As the vehicle transitions from the loading conveyors to the washing conveyors, it passes over a flat plate section, which allows the tires to rotate.

In the washing conveyor segment, the vehicle is subjected to a comprehensive cleaning process. The washing conveyors are surrounded by an array of cleaning equipment such as spray nozzles, brushes, and chemical applicators. These components are designed to work in concert with the conveyor. As the vehicle exits the washing conveyor, it encounters another flat plate section. This section is equipped for tire treatment applications.

Post-cleaning, the vehicle progresses to the departing conveyors, where final treatments and drying are conducted. The design of this conveyor segment focuses on the application of finishing treatments and the removal of excess water, preparing the vehicle for exit.

As the vehicle reaches the end of the departing conveyor, it transitions over a safety attachment, designed to prevent accidents. The safety attachment ensures a smooth and safe transition as the vehicle exits the conveyor system and the car wash facility. As the vehicle departs the departing conveyor, it encounters the exit pavement designed with a transverse slope. This slope functions to align the vehicle with the departing conveyors. The slope functions such that vehicles, including extended vehicles, vehicles pulling a trailer, or vehicles pulling a boat, may depart the conveyor and remain on a straightforward path.

The elements of the figures are not exclusive. Other embodiments may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure that are within known or customary practice in the art to which these teachings pertain.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed.

I claim:

1. A vehicle wash system comprising:
   a tunnel having a length extending between an entrance opening and an exit opening;

a vehicle wash path extending along the length of the tunnel;

a conveyor extending along at least one side of the vehicle wash path, the conveyor comprising:
 a frame connected to a floor of the tunnel and extending along the vehicle wash path;
 a drive roller connected to the frame at a first end of the conveyor, the drive roller being connected to a motor to rotate the drive roller;
 a tail roller connected to the frame at a second end of the conveyor opposite the drive roller;
 a belt in contact with the drive roller and the tail roller, wherein the belt rotates over the drive roller and the tail roller as it is driven by the drive roller, the belt rotating in a forward direction along an upper portion of the conveyor from an entrance end of the conveyor to an exit end of the conveyor and in a backward direction along an underside portion of the conveyor from the exit end of the conveyor to the entrance end of the conveyor;
 a plurality of idler rollers, each idler roller comprising an exterior cylindrical body and an interior cylindrical shaft extending beyond the exterior cylindrical body at both ends, the idler rollers being positioned at intervals along the conveyor between the drive roller and the tail roller and between the upper portion and lower portion of the belt;
 a plurality of bushings connected to the frame, each bushing comprising an aperture for receiving the interior cylindrical shaft of idler rollers, wherein each idler roller is rotatably connected to at least one of the bushings;
 wherein each idler roller rotates in response to a vehicle load pressing the belt against the idler roller, and wherein any idler roller that is not under said vehicle load does not substantially rotate as the vehicle traverses the vehicle wash system on the moving belts;
and wash equipment disposed along the sides and overhead of the vehicle wash path; and
wherein a vehicle to be washed enters the tunnel through the entrance opening, is transported along the vehicle wash path via the conveyor, is cleaned as it progresses through the vehicle wash path by the wash equipment, and then exits the tunnel through the exit opening.

2. The vehicle wash system of claim 1, wherein the belt is unhinged.

3. The vehicle wash system of claim 1, wherein the drive roller is located at the exit end of the conveyor, and the tail roller is located at the entrance end of the conveyor.

4. The vehicle wash system of claim 1, wherein the belt is tensioned between the drive roller and the tail roller such that the belt has a catenary sag when no vehicle is present that is less than or equal to a predetermined value, thereby reducing a normal force between the belt and idler rollers such that the idler rollers do not rotate when no vehicle load is present.

5. The vehicle wash system of claim 1, further comprising at least one intermediate roller positioned between the drive roller and tail roller and in between the plurality of idler rollers, such that the upper portion of the belt is in contact with the at least one intermediate roller when the belt is unloaded.

6. The vehicle wash system of claim 1, wherein the conveyor further comprises a transverse camber across its width by elevating the conveyor relative to a static guideway positioned alongside the conveyor.

7. The vehicle wash system of claim 6, wherein the transverse camber creates an elevation different between the conveyor and the static guideway, the elevation difference characterized by a ratio of about 1 inch of rise over about 60 inches of horizontal distance.

8. The vehicle wash system of claim 1, wherein the conveyor further comprises a longitudinal gradient along its length, the gradient being an incline from the entrance end to the exit end of the conveyor.

9. The vehicle wash system of claim 1, wherein each idler roller is comprised of stainless steel.

10. The vehicle wash system of claim 1, wherein each idler roller has a mass selected such that, under a tension and weight provided by the belt without any additional load, a torque exerted by the belt on the idler roller is less than a breakaway torque of the idler roller, thereby preventing rotation of the idler roller when no load is present on the belt.

11. The vehicle wash system of claim 1, further comprising a static guideway extending along the length of the tunnel on a side of the vehicle wash path opposite and parallel to the conveyor.

12. The vehicle wash system of claim 11, wherein the static guideway is smoothed to reduce surface irregularities and coated with an epoxy.

13. The vehicle wash system of claim 1, wherein the bushings are comprised of ultra-high-molecular-weight polyethylene (UHMW-PE).

14. The vehicle wash system of claim 1, wherein the drive roller has a crowned shape, with a larger diameter at its longitudinal center point relative to its cylindrical ends.

15. A conveyor for transporting a vehicle through a wash system comprising:
 a frame mounted to a floor of the wash system;
 a drive roller connected to the frame at a first end of the conveyor, the drive roller being connected to a motor to rotate the drive roller;
 a tail roller connected to the frame positioned at a second end of the conveyor opposite the drive roller;
 a belt in contact with the drive roller and the tail roller, wherein the belt rotates over the drive roller and tail roller as it is driven by the drive roller, the belt rotating in a forward direction along an upper portion of the belt from an entrance end of the conveyor to an exit end of the conveyor and in a backward direction along an underside portion of the belt from the exit end of the conveyor to the entrance end of the conveyor;
 a plurality of idler rollers, each idler roller comprising an exterior cylindrical body and an interior cylindrical shaft extending beyond the exterior cylindrical body at both ends, the idler rollers being positioned at intervals along the conveyor between the drive roller and the tail roller and between the upper portion and lower portion of the belt, wherein the upper portion of the belt makes contact with each idler roller when a contact point of the vehicle to the belt is above each idler roller;
 a plurality of bushings connected to the frame, each bushing comprising an aperture, wherein each of the idler roller is rotatably connected to one of the bushings; and
 wherein each idler roller rotates in response to a vehicle load pressing the belt against the idler roller, and wherein any idler roller that is not under said vehicle load does not substantially rotate as the vehicle traverses the conveyor on the moving belt.

16. The conveyor of claim 15, wherein the belt is unhinged.

17. The conveyor of claim 15, wherein the drive roller is located at the exit end of the conveyor, and the tail roller is located at the entrance end of the conveyor.

18. The conveyor of claim 15, wherein the belt is tensioned between the drive roller and the tail roller such that the belt has a catenary sag when no vehicle is present that is less than or equal to a predetermined value, thereby reducing a normal force between the belt and idler rollers such that the idler rollers do not rotate when no vehicle load is present.

19. The conveyor of claim 15, further comprising at least one intermediate roller, wherein each intermediate roller is positioned equidistant between the drive roller, tail roller and any other intermediate roller, such that the upper portion of the belt is in contact with the at least one intermediate roller when the belt is unloaded.

20. The conveyor of claim 15, wherein the conveyor further comprises a transverse camber across its width by elevating the conveyor relative to a static guideway positioned alongside the conveyor.

21. The conveyor of claim 15, wherein the conveyor further comprises a longitudinal gradient along its length, the gradient being an incline from the entrance end to the exit end of the conveyor.

22. The conveyor of claim 15, wherein each idler roller is comprised of stainless steel.

23. The conveyor of claim 15, wherein each idler roller has a mass selected such that, under a tension and weight provided by the belt without any additional load, a torque exerted by the belt on the idler roller is less than a breakaway torque of the idler roller, thereby preventing rotation of the idler roller when no load is present on the belt.

24. The conveyor of claim 15, further comprising a static guideway extending alongside and parallel to the conveyor.

25. The conveyor of claim 24, wherein the static guideway is smoothed to reduce surface irregularities and coated with an epoxy.

26. The conveyor of claim 15, wherein the bushings are comprised of ultra-high-molecular-weight polyethylene (UHMW-PE).

\* \* \* \* \*